United States Patent
Osterman et al.

(10) Patent No.: US 9,933,631 B2
(45) Date of Patent: Apr. 3, 2018

(54) ELECTRO-OPTIC GUEST-HOST LIQUID CRYSTAL VARIABLE TRANSMISSION FILTER WITH WIDE VIEWING ANGLE

(71) Applicant: LC-TEC Displays AB, Borlänge (SE)

(72) Inventors: Jesper Osterman, Falun (SE); Terry J. Scheffer, Hilo, HI (US)

(73) Assignee: LC-TEC Displays AB, Borlange (SE)

( * ) Notice: Subject to any disclaimer, the term of this patent is extended or adjusted under 35 U.S.C. 154(b) by 0 days.

(21) Appl. No.: 15/450,989

(22) Filed: Mar. 6, 2017

(65) Prior Publication Data

US 2017/0276960 A1 Sep. 28, 2017

Related U.S. Application Data

(60) Provisional application No. 62/314,253, filed on Mar. 28, 2016.

(51) Int. Cl.

| | |
|---|---|
| *G02F 1/13363* | (2006.01) |
| *G02F 1/1337* | (2006.01) |
| *G02F 1/1343* | (2006.01) |
| *G02F 1/1347* | (2006.01) |
| *G02C 7/02* | (2006.01) |

(Continued)

(52) U.S. Cl.
CPC .......... *G02C 7/022* (2013.01); *G02F 1/1337* (2013.01); *G02F 1/1393* (2013.01); *G02F 1/1396* (2013.01); *G02F 1/13363* (2013.01); *G02F 1/13439* (2013.01); *G02F 1/13475* (2013.01);

(Continued)

(58) Field of Classification Search
CPC ............... G02F 1/13363; G02F 1/1337; G02F 1/13439; G02F 1/13475; G02F 1/13725; G02F 1/1393; G02F 1/1396; G02F 2001/133638; G02F 2413/01; G02C 7/022

See application file for complete search history.

(56) References Cited

U.S. PATENT DOCUMENTS

| | | | | |
|---|---|---|---|---|
| 5,283,675 A | * | 2/1994 | Ooi ................... | G02F 1/133371 349/143 |
| 6,730,446 B2 | | 5/2004 | Sahouani et al. | |

(Continued)

OTHER PUBLICATIONS

Koester, Charles J., "Achromatic Combinations of Half-Wave Plates," J. Opt. Soc. Am. 49(4), 405-409, Apr. 1959.

*Primary Examiner* — Ryan Crockett
*Assistant Examiner* — Mariam Qureshi
(74) *Attorney, Agent, or Firm* — Stoel Rives LLP

(57) ABSTRACT

A variable transmission filter combines in optical series first and second guest-host liquid crystal devices arranged such that one of them is rotated 180° about its normal axis with respect to the other one. The reverse arrangement of the liquid crystal directors of the first and second guest-host liquid crystal devices improves the viewing angle range of the variable transmission filter but, without compensation, introduces a diminution of contrast ratio. A polarization state-changing device positioned between the first and second guest-host liquid crystal devices changes the polarization states of light exiting the first guest-host_liquid crystal device such that transmittance of light in first and second orthogonal polarization states incident on the first guest-host liquid crystal device responds to electric fields applied to the first and second liquid crystal devices and thereby counteracts the diminution of contrast ratio while maintaining the improved viewing angle range.

20 Claims, 21 Drawing Sheets

(51) Int. Cl.
*G02F 1/139* (2006.01)
*G02F 1/137* (2006.01)

(52) U.S. Cl.
CPC ............. *G02F 1/13725* (2013.01); *G02F 2001/133638* (2013.01); *G02F 2413/01* (2013.01)

(56) References Cited

U.S. PATENT DOCUMENTS

| | | | |
|---|---|---|---|
| 8,891,042 B1 * | 11/2014 | Osterman | G02B 5/005 349/74 |
| 9,134,551 B2 | 9/2015 | Sukhomlinova et al. | |
| 9,164,314 B2 | 10/2015 | Van Oosten | |
| 2012/0242924 A1 * | 9/2012 | Galstian | G02F 1/134309 349/54 |

* cited by examiner

ELECTRO-OPTIC GUEST-HOST LIQUID CRYSTAL VARIABLE TRANSMISSION FILTER WITH WIDE VIEWING ANGLE

RELATED APPLICATION

This application claims benefit of U.S. Patent Application No. 62/314,253, filed Mar. 28, 2016.

COPYRIGHT NOTICE

© 2017 LC-TEC Displays AB. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates to a guest-host liquid crystal variable transmission filter with a wide viewing angle for an image recording device, such as a camera, or in combination with an image viewing device, such as a background filter for a near-eye display.

BACKGROUND INFORMATION

For some applications, it is desirable to have a liquid crystal variable transmission filter that can transmit at least 50% of unpolarized light incident on it. Such high transmittance is not possible with traditional liquid crystal variable transmission filters with high-durability input and output polarizers because the high amount of light absorption by these polarizers allows the variable transmission filter to transmit only 18%-20% of unpolarized light. A liquid crystal variable transmission filter design that does not require polarizers could achieve at least 50% transmission, or f/1. Such a design should also have minimal color shift over its operating range, as well as minimal variation of the transmitted luminance over a range of incident polar angles especially about the normal incidence direction.

A guest-host liquid crystal camera iris represented in FIGS. 6A and 6B of U.S. Patent Application Pub. No. US 2012/0242924 has two homogeneously aligned guest-host liquid crystal cells placed in optical series and oriented with their surface alignment directions at 90°. (These two guest-host cells configured with a 90°-surface alignment direction orientation are referred to as two crossed guest-host cells.) While it is theoretically possible that this camera iris could transmit 50% of unpolarized light at normal incidence, there is an unacceptably large viewing angle dependence of the transmittance. Such angular dependent transmittance would result in a non-uniform and asymmetric perception of light intensity, depending upon the viewing angle of the transmitted light reaching the eye of an observer or a light-sensitive area of a recording medium in a camera.

SUMMARY OF THE DISCLOSURE

A preferred embodiment of the disclosed variable transmission filter combines in optical series first and second guest-host liquid crystal devices arranged such that one of them is rotated 180° about its normal axis with respect to the other one of them in a reverse arrangement. The first guest-host device includes first electrode structures having interior surfaces between which is contained liquid crystal material that has liquid crystal directors. The liquid crystal directors have projections lying on the interior surfaces. A polarization state-changing device, such as a half-wave optical retarder, is positioned between the first and second guest-host liquid crystal devices. The reverse arrangement of the liquid crystal directors of the first and second guest-host liquid crystal devices improves the viewing angle range of the variable transmission filter but, as a consequence and without the polarization state changing device, introduces a diminution of contrast ratio. The reason for this diminution of contrast ratio is as follows. Unpolarized light incident on the variable transmission filter can be considered as first and second orthogonally related linear polarization states, the first polarization state and the second polarization state being, respectively, parallel to and perpendicular to the projections of the liquid crystal directors of the first guest-host liquid crystal device. In the absence of compensation there is no appreciable change in transmittance of light of the second polarization state propagating through the variable transmission filter in response to electric fields applied to the first and second guest-host liquid crystal devices and the contrast ratio of the variable transmission filter will always be less than 2. The diminution of contrast ratio caused by the reverse arrangement can be compensated for by positioning the polarization state-changing device between the first and second guest-host liquid crystal devices to introduce changes in the polarization states of light exiting the first guest-host liquid crystal device such that transmittance of light in the first polarization state and in the second polarization state incident on the first guest-host liquid crystal device responds to, respectively, an electric field applied to the first guest-host liquid crystal device and an electric field applied to the second guest-host liquid crystal device. The polarization state-changing device counteracts the diminution of contrast ratio resulting from the reverse arrangement of the first and second guest-host liquid crystal devices while maintaining the improved viewing angle range afforded by the reverse arrangement.

A preferred polarization state-changing device is a 90°-polarization rotator. In a first implementation, the 90°-polarization rotator is a conventional half-wave optical retarder. In a second implementation, the 90°-polarization rotator is an achromatic 90°-polarization rotator comprising a plurality of conventional half-wave optical retarders with their optic axes oriented in prescribed directions. In a third implementation, the 90°-polarization rotator is a 90°-twisted nematic layer, either in the form of a conventional liquid crystal cell or as a liquid crystal polymer layer. Skilled persons will appreciate that a 90°-polarization rotator can be achieved also with other optical arrangements.

In a fourth implementation, the polarization state-changing device is a half-wave optical retarder of a wide band design comprising a single layer polymer film made from a blend polymer or a copolymer including optically positive and optically negative monomer units.

Advantageous applications of the disclosed liquid crystal variable transmission filter include its use in smart eyewear, such as augmented reality glasses, benefiting from electronic dimming control.

Additional aspects and advantages will be apparent from the following detailed description of a preferred embodiment, which proceeds with reference to the accompanying drawings.

DETAILED DESCRIPTION OF A PREFERRED EMBODIMENT

Figure 1:
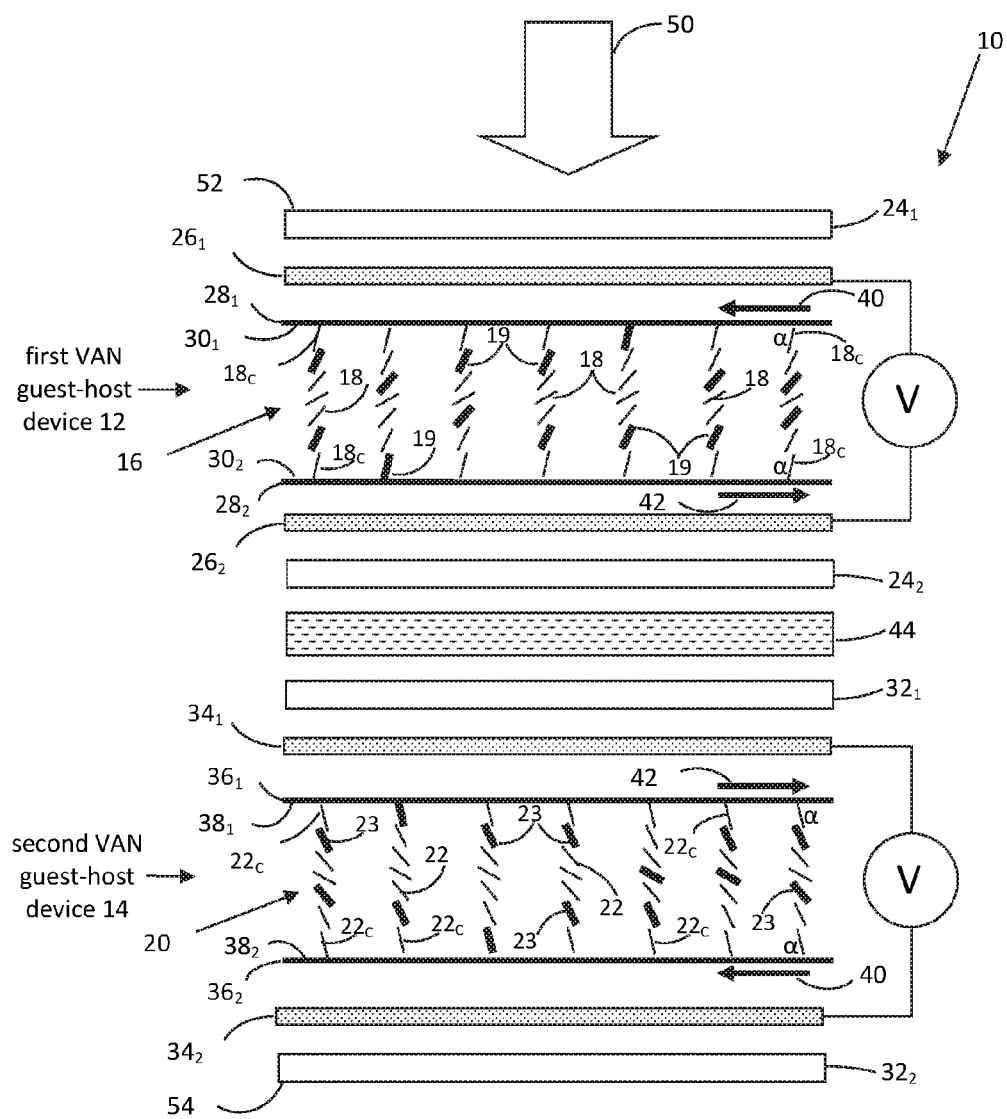
FIG. 1 is a diagrammatic exploded view of an embodiment of the disclosed variable transmission filter that includes an optical element implemented as a conventional half-wave optical retarder positioned between two vertically aligned guest-host liquid crystal devices, one rotated 180° about its normal axis with respect to the other.

FIG. 1 is a simplified diagram of a preferred embodiment of the disclosed guest-host liquid crystal variable transmission filter 10, which comprises a first VAN guest-host liquid crystal device 12 and a second VAN guest-host liquid crystal device 14, each of which contains a host liquid crystal having a negative dielectric anisotropy to which a dichroic dye or dye mixture is added. Liquid crystal devices 12 and 14 are of the electrically controlled birefringence (ECB) type, which, for the case of a host liquid crystal with a negative dielectric anisotropy, are also referred to as vertically aligned nematic (VAN) guest-host liquid crystal devices. For simplicity, index matching coatings of each of VAN guest-host liquid crystal devices 12 and 14 are omitted from the diagram. VAN guest-host liquid crystal devices 12 and 14 have, respectively, a director field 16 composed of liquid crystal directors 18 and a director field 20 composed of liquid crystal directors 22. Each of director fields 16 and 20 is shown in at an intermediate drive voltage, V. Director field 20 of VAN guest-host liquid crystal device 14 is similar to director field 16 of VAN guest-host liquid crystal device 12, except that VAN guest-host liquid crystal device 14 is rotated 180° about its normal axis. In other words, liquid crystal directors 22 in director field 20 are reversely arranged in comparison to corresponding liquid crystal directors 18 in director field 16. Heavy black line segments 19 embedded in director field 16 of first VAN guest-host device 12 and heavy black line segments 23 embedded in director field 20 of the second VAN guest-host device 14 indicate the dissolved dichroic dye or mixture of dyes.

VAN liquid crystal device 12 has a spaced-apart pair of first electrode structures that include substrate plates $24_1$ and $24_2$. An optically transparent electrode $26_1$ formed on substrate plate $24_1$ constitutes, for one first electrode structure of the pair, an interior surface on which is formed an alignment layer $28_1$. An optically transparent electrode $26_2$ formed on substrate plate $24_2$ constitutes, for the other first electrode structure of the pair, an interior surface on which is formed an alignment layer $28_2$. Alignment layers $28_1$ and $28_2$ have respective alignment surfaces $30_1$ and $30_2$.

VAN guest-host liquid crystal device 14 has a spaced-apart pair of second electrode structures that include substrate plates $32_1$ and $32_2$. An optically transparent electrode $34_1$ formed on substrate plate $32_1$ constitutes, for one second electrode structure of the pair, an interior surface on which is formed an alignment layer $36_1$. An optically transparent electrode $34_2$ formed on substrate plate $32_2$ constitutes, for the other second electrode structure of the pair, an interior surface on which is formed an alignment layer $36_2$. Alignment layers $36_1$ and $36_2$ have respective alignment surfaces $38_1$ and $38_2$.

Surface-contacting directors 18c and 22c make pretilt angles α of preferably about 87° with their respective alignment surfaces $30_1$, $30_2$ and $38_1$, $38_2$. This type of alignment is commonly referred to as quasi-homeotropic alignment because the pretilt angle is close to 90°. Azimuthal directions of the surface-contacting directors are indicated by arrows. Specifically, arrows 40 indicate the azimuthal direction of surface-contacting directors 18c and 22c at alignment surfaces $30_1$ and $38_2$, respectively; and arrows 42 indicate the azimuthal direction of surface-contacting directors 18c and 22c at alignment surfaces $30_2$ and $38_1$. Arrows 42 are parallel at the adjoining or confronting surfaces of substrate plates $24_2$ and $32_1$ of VAN guest-host liquid crystal devices 12 and 14, respectively. Incoming unpolarized light 50, which has orthogonally related polarization states, is incident on a light input face 52 of substrate plate $24_1$. Liquid crystal directors 18 have projections lying on the interior surfaces of the first electrode structures, and liquid crystal directors 22 have projections lying on the interior surfaces of the second electrode structures. The projections of liquid crystal directors 18 and 22 are collinear with the azimuthal directions of the surface contacting directors, as indicated by arrows 40 and 42 in FIG. 1. The first polarization state and the second polarization state of unpolarized incident light 50 are, respectively, parallel to and perpendicular to the projections of liquid crystal directors 18.

In a first implementation, an optical element 44 is a conventional half-wave optical retarder positioned between VAN guest-host liquid crystal devices 12 and 14. The half-wave optical retarder is oriented with its optic axis at 45° to arrows 42, which indicate the azimuthal direction of surface-contacting directors 18c and 22c at alignment surfaces $30_2$ and $38_1$. A conventional half-wave optical retarder rotates by 90° normally incident light linear polarized at 45° to its optic axis at the design wavelength $\lambda_0$, e.g., $\lambda_0$=550 nm for a 275 nm half-wave optical retarder. For wavelengths other than $\lambda_0$, linear polarized light incident at 45° to the optic axis of the optical retarder becomes elliptically polarized.

In a second implementation, optical element 44 of FIG. 1 is an achromatic 90°-polarization rotator of the type described by C. J. Koester in "Achromatic combinations of half-wave plates," *J. Opt. Soc. Am.* 49(4), 405-409 (1959). This type of achromatic 90°-polarization rotator comprises a stack of conventional half-wave optical retarders placed together at prescribed angles. A combination that is of particular interest for the disclosed variable transmission filter is the three-layer stack, in which the optic axis of the first half-wave optical retarder makes a (11.25°+δ) angle with the direction of arrows 42 in FIG. 1, the optic axis of the second half-wave optical retarder makes a 45° angle with the arrows 42, and the optic axis of the third half-wave optical retarder makes a (78.75°−δ) angle with arrows 42.

The parameter, δ, is known as the trim angle and is on the order of a few degrees or less, e.g. 0.5°. A two-layer stack is also known, in which the optic axis of the first half-wave optical retarder makes a (22.5°+δ) angle with the direction of arrows 42 in FIG. 1 and the optic axis of the second half-wave optical retarder makes a (67.5°−δ) angle with arrows 42 in FIG. 1.

In a third implementation, optical element 44 is a birefringent layer described by a director field, in which the director uniformly rotates by 90° in the plane of the layer from one surface of the layer to the other. An example of such a birefringent layer would be a 90°-twisted nematic liquid crystal layer comprising either a conventional liquid crystal or a solid, polymerized liquid crystal. The 90°-twisted nematic structure preferably obeys the "first minimum" condition $\Delta n\, d/\lambda_0 = \sqrt{3}/2$, where Δn is the birefringence of the liquid crystal or polymerized liquid crystal, d is the layer thickness, and $\lambda_0$ is the design wavelength.

In a fourth implementation, optical element 44 in FIG. 1 is a wide-band half-wave optical retarder film using the type of material manufactured by Teijin, Ltd., Tokyo, Japan. These optical retarder films are made from a blend polymer or a copolymer including optically positive and optically negative monomer units. These wide-band polarization state-changing films have a characteristic property of exhibiting phase retardation that is practically independent of wavelength over a wide band of wavelengths. This half-wave optical retarder is preferably a single retarder film but can be constructed as a laminated two-layer stack of quarter-wave optical retarder films arranged with their optic axes parallel to each other. The outside of such a laminated stack would have a first major surface and a second major surface. As with the first implementation, this half-wave optical retarder is positioned between VAN guest-host liquid crystal devices 12 and 14, and its optic axis is oriented at 45° to arrows 42, which indicate the azimuthal direction of surface-contacting directors 18c and 22c at alignment surfaces $30_2$ and $38_1$.

Figure 2:
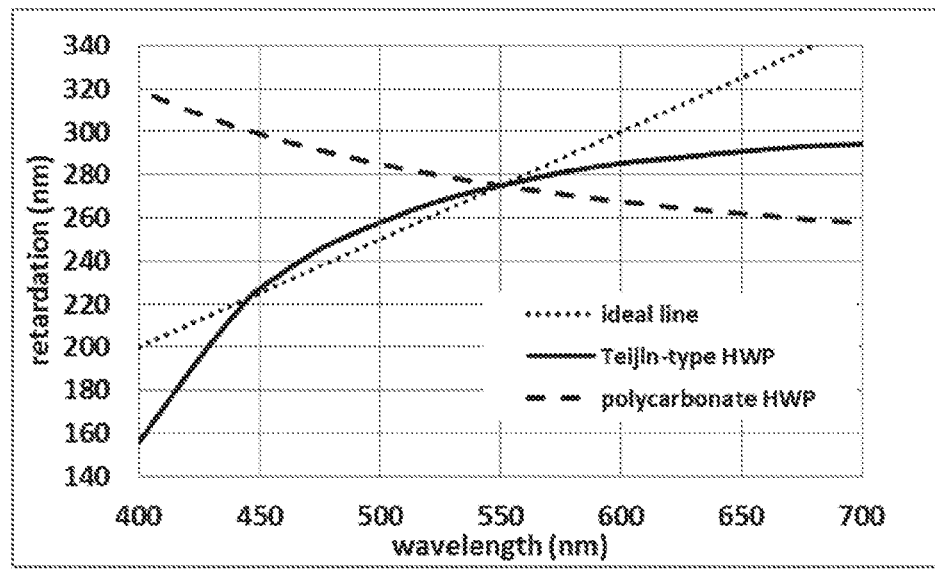
FIG. 2 shows a comparison of the wavelength dependence of an achromatic Teijin-type half-wave optical retarder with that of a polycarbonate type half-wave optical retarder.

FIG. 2 compares the wavelength dependence of a Teijin-type half-wave optical retarder with that of a half-wave optical retarder made from polycarbonate film. The polycarbonate half-wave optical retarder imparts half-wave retardation only at 550 nm, where its retardation is 275 nm. The Teijin-type half-wave optical retarder, on the other hand, not only is a half-wave retarder at 550 nm, where its retardation is 275 nm, but also is a half-wave retarder at 440 nm, where its retardation is 220 nm. Its wavelength dependence approaches that of a wavelength-independent half-wave optical retarder over a wide band of wavelengths, as indicated by the ideal line in FIG. 2.

Figure 3:
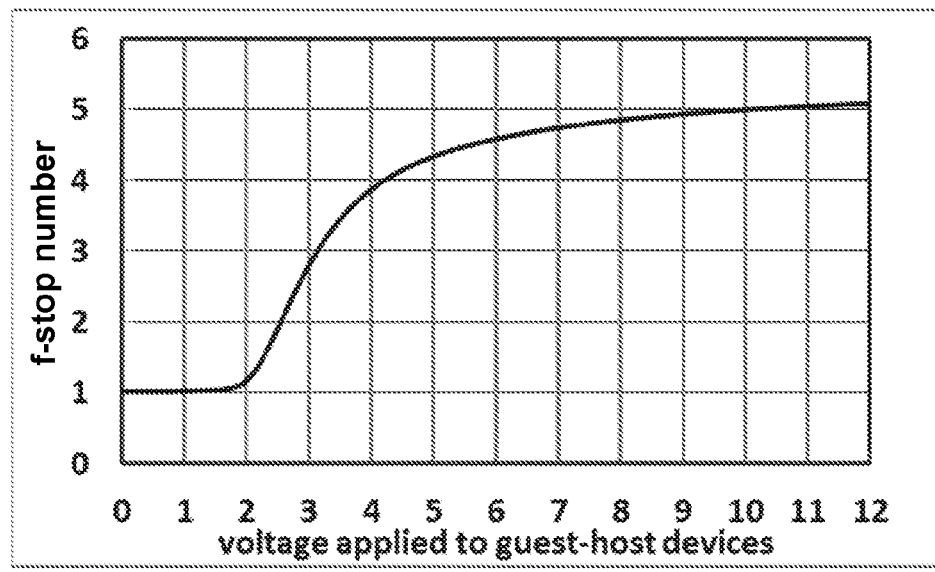
FIG. 3 shows a simulated electro-optical curve of the embodiment depicted in FIG. 1, with the vertical axis scale indicating the f-stop number.
Figure 4A:
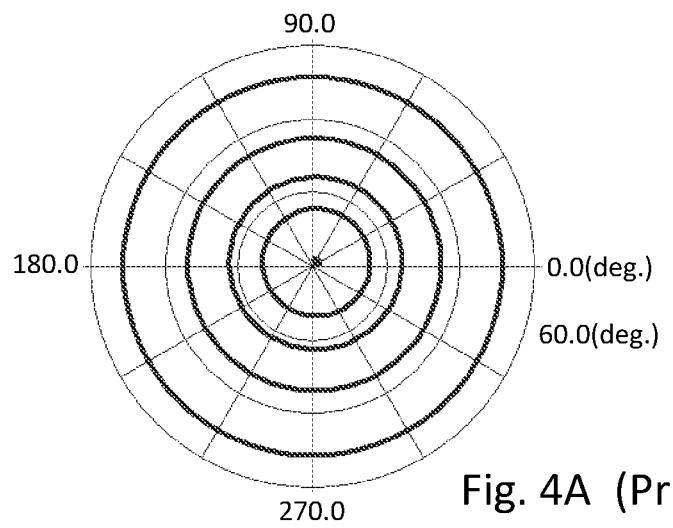
FIG. 4A shows a simulated iso-luminance diagram for a prior art transmissive filter, with drive voltages adjusted for f/1 transmittance for normally incident light.
Figure 4B:
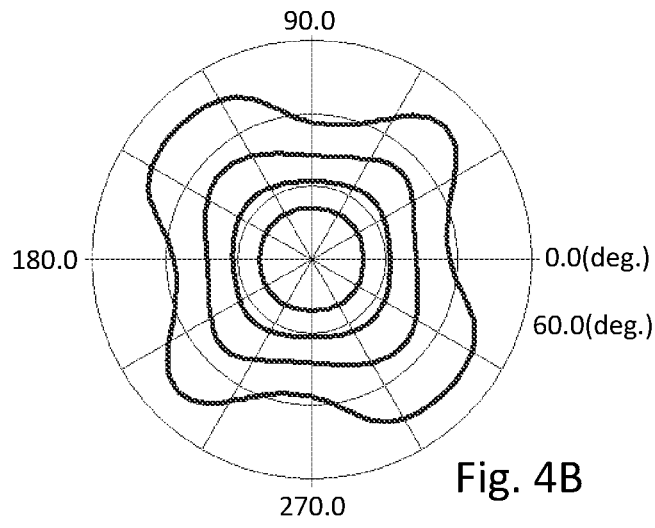
FIG. 4B shows a simulated iso-luminance diagram for a wide-angle transmissive filter including a conventional half-wave optical retarder in accordance with the disclosure, with drive voltages adjusted for f/1 transmittance for normally incident light.
Figure 4C:
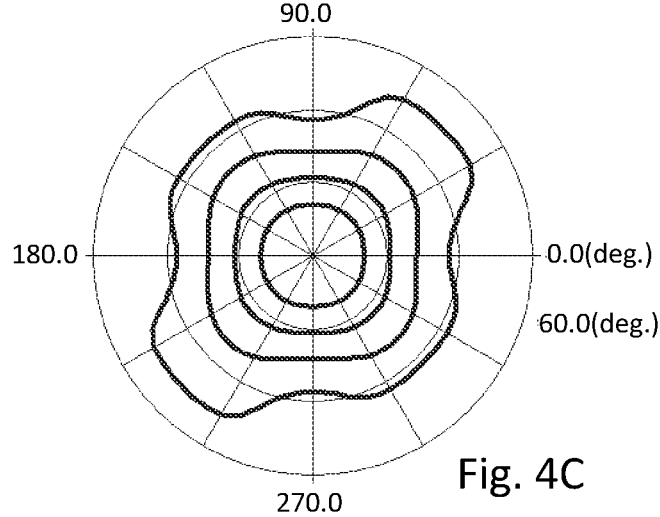
FIG. 4C shows a simulated iso-luminance diagram for a wide-angle transmissive filter including a three-layer achromatic 90°-polarization rotator in accordance with the disclosure, with drive voltages adjusted for f/1 transmittance for normally incident light.
Figure 5A:
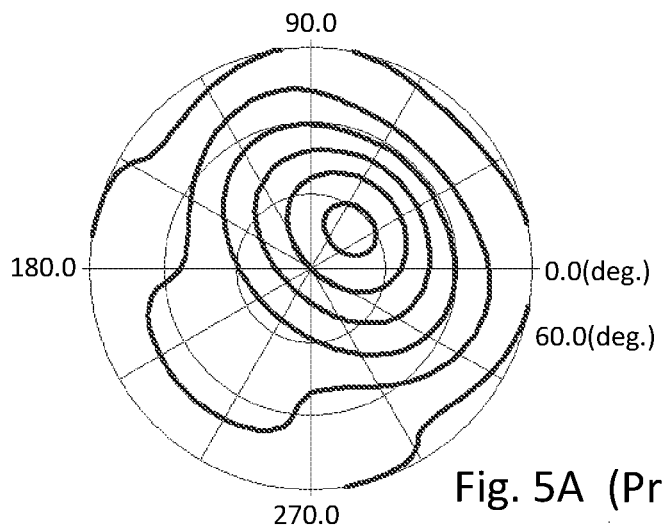
FIG. 5A shows a simulated iso-luminance diagram for a prior art transmissive filter, with drive voltages adjusted for f/2 transmittance for normally incident light.
Figure 5B:
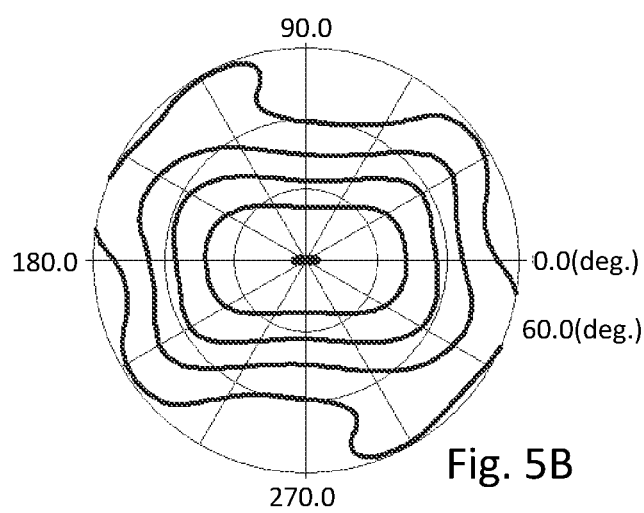
FIG. 5B shows a simulated iso-luminance diagram for a wide-angle transmissive filter including a conventional half-wave optical retarder in accordance with the disclosure, with drive voltages adjusted for f/2 transmittance for normally incident light.
Figure 5C:
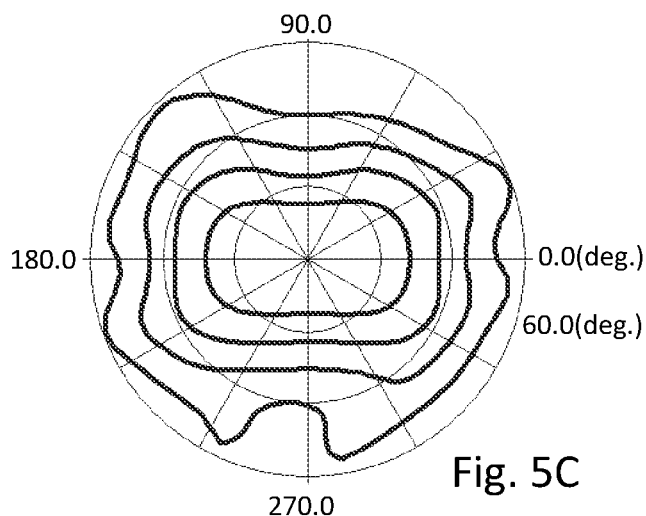
FIG. 5C shows a simulated iso-luminance diagram for a wide-angle transmissive filter including a three-layer achromatic 90°-polarization rotator in accordance with the disclosure, with drive voltages adjusted for f/2 transmittance for normally incident light.
Figure 6A:
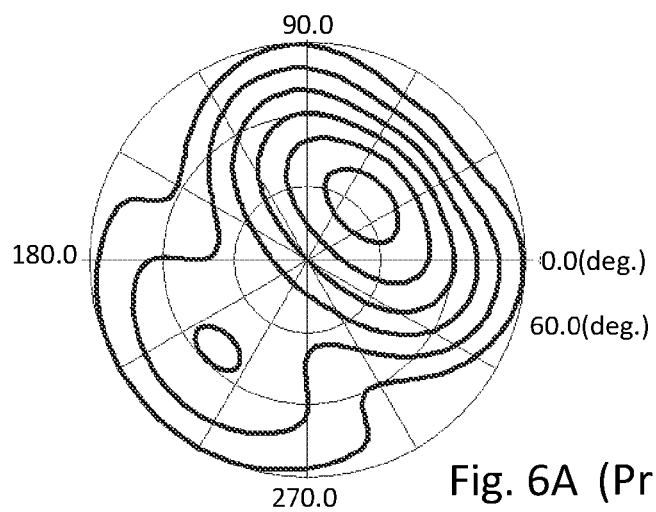
FIG. 6A shows a simulated iso-luminance diagram for a prior art transmissive filter with drive voltages adjusted for f/3 transmittance for normally incident light.
Figure 6B:
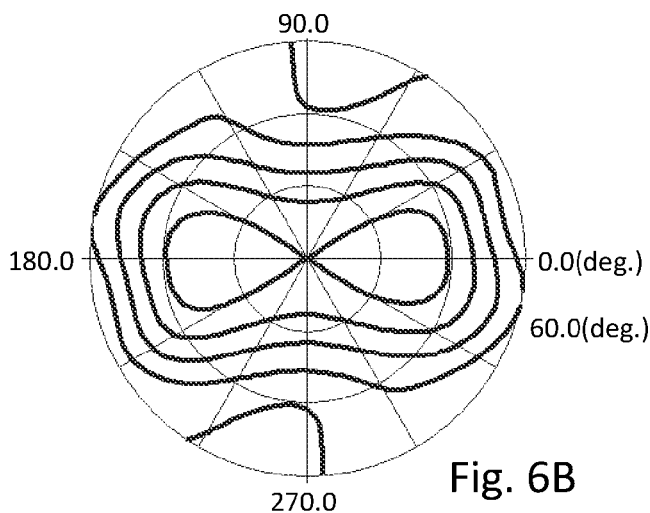
FIG. 6B shows a simulated iso-luminance diagram for a wide-angle transmissive filter including a conventional half-wave optical retarder in accordance with the disclosure, with drive voltages adjusted for f/3 transmittance for normally incident light.
Figure 6C:
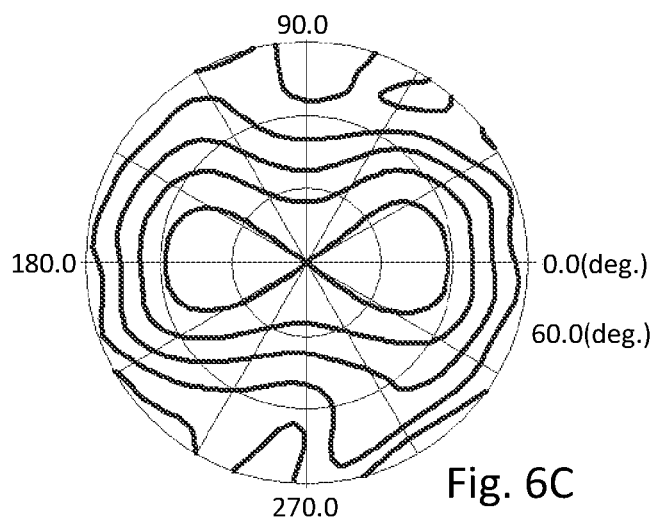
FIG. 6C shows a simulated iso-luminance diagram for a wide-angle transmissive filter including a three-layer achromatic 90°-polarization rotator in accordance with the disclosure, with drive voltages adjusted for f/3 transmittance for normally incident light.
Figure 7A:
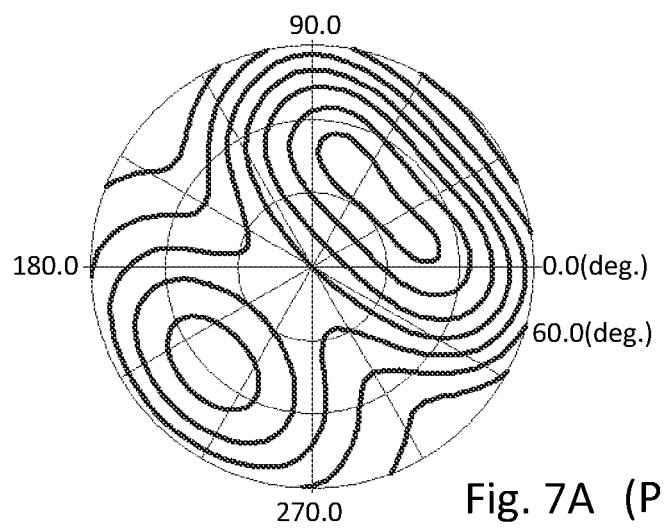
FIG. 7A shows a simulated iso-luminance diagram for a prior art transmissive filter with drive voltages adjusted for f/4 transmittance for normally incident light.
Figure 7B:
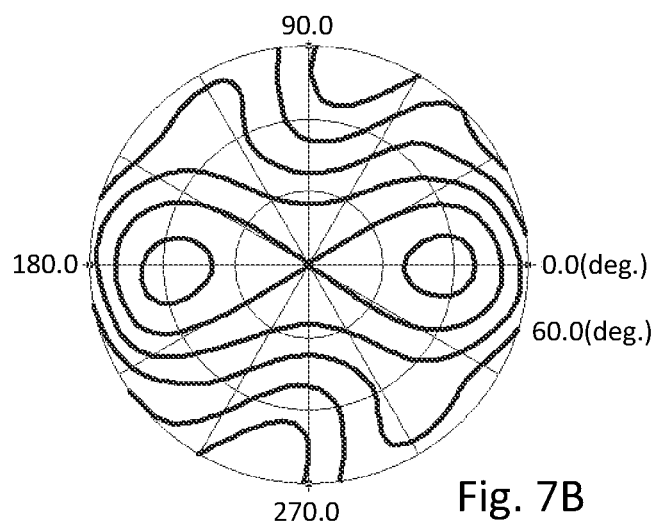
FIG. 7B shows a simulated iso-luminance diagram for a wide-angle transmissive filter including a conventional half-wave optical retarder in accordance with the disclosure, with drive voltages adjusted for f/4 transmittance for normally incident light.
Figure 7C:
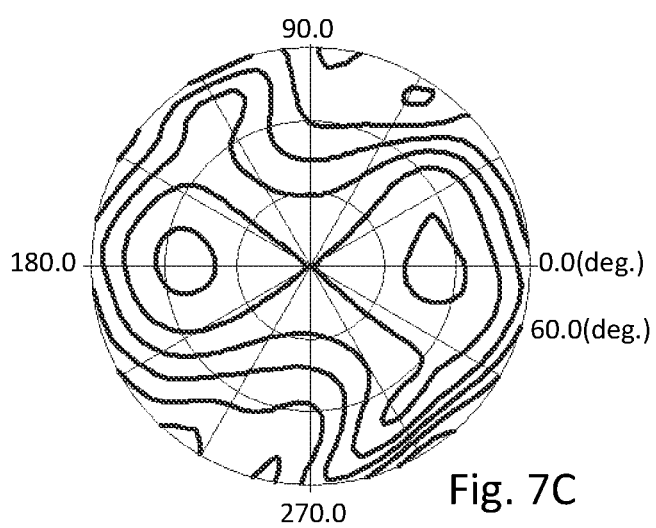
FIG. 7C shows a simulated iso-luminance diagram for a wide-angle transmissive filter including a three-layer achromatic 90°-polarization rotator in accordance with the disclosure, with drive voltages adjusted for f/4 transmittance for normally incident light.
Figure 8A:
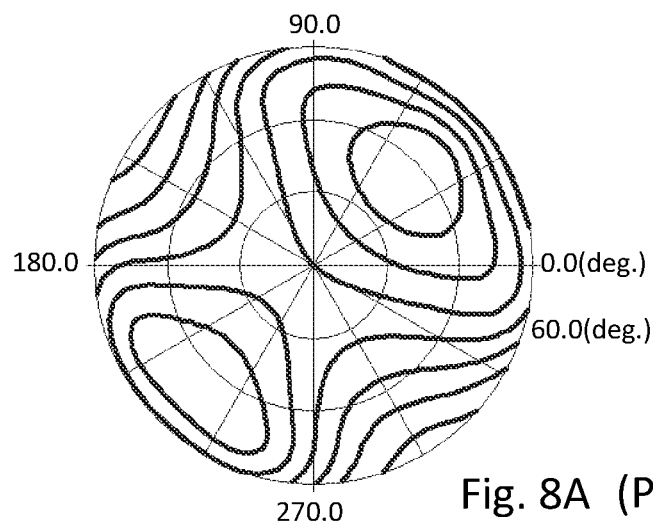
FIG. 8A shows a simulated iso-luminance diagram for a prior art transmissive filter with drive voltages adjusted for f/5 transmittance for normally incident light.
Figure 8B:
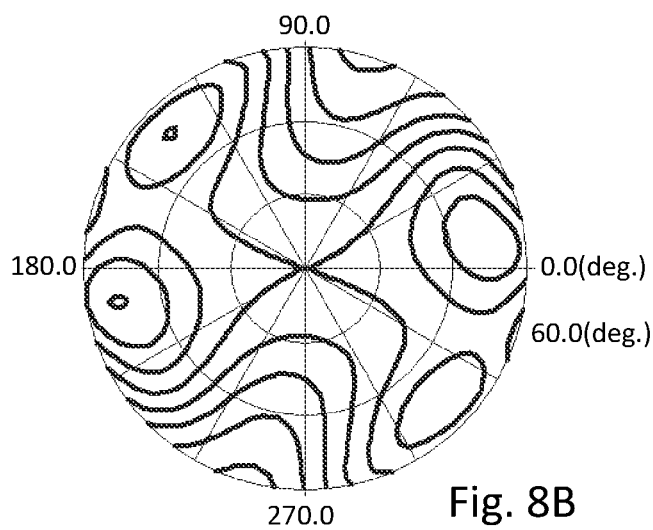
FIG. 8B shows a simulated iso-luminance diagram for a wide-angle transmissive filter including a conventional half-wave optical retarder in accordance with the disclosure, with drive voltages adjusted for f/5 transmittance for normally incident light.
Figure 8C:
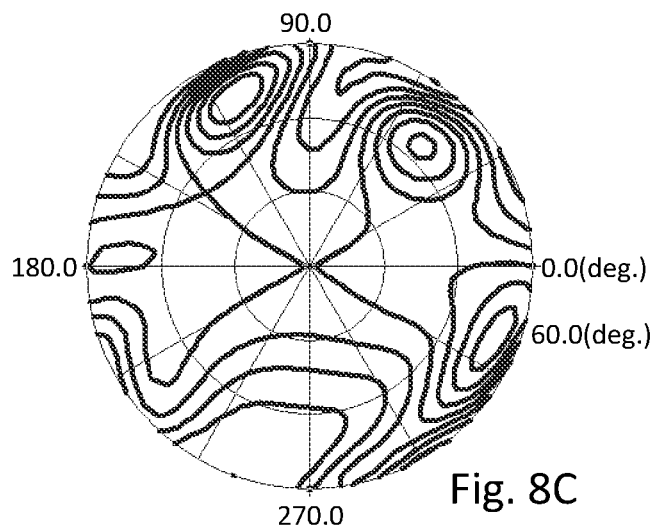
FIG. 8C shows a simulated iso-luminance diagram for a wide-angle transmissive filter including a three-layer achromatic 90°-polarization rotator in accordance with the disclosure, with drive voltages adjusted for f/5 transmittance for normally incident light.

FIG. 3 shows a simulated electro-optical curve of the embodiment depicted in FIG. 1 with the vertical scale on the vertical axis indicating the f-stop number. The simulation was carried out using the commercial software LCD Master, available from Shintech Inc., Yamaguchi, Japan. The cell gap of the two VAN guest-host cells is 9.0 μm, and the pretilt angle is 87° with the alignment surfaces. The guest-host dye or dye mixture is assumed to be achromatic, and the half-wave optical retarder has a constant retardation of 275 nm for all wavelengths. The simulations use liquid crystal material constants given in the Table below.

| | |
|---|---|
| Δn (589 nm, 20° C.) | 0.080 |
| $n_e$ (589 nm, 20° C.) | 1.556 |
| $n_o$ (589 nm, 20° C.) | 1.476 |

| | |
|---|---|
| Δε (1 KHz, 25° C.) | −4.4 |
| ε_∥ (1 KHz, 25° C.) | 3.6 |
| ε_+ (1 KHz, 25° C.) | 8.0 |
| $K_{11}$ | 14.4 pN |
| $K_{22}$ | 7.1 pN |
| $K_{33}$ | 19.1 pN |

FIGS. 4A, 5A, 6A, 7A, and 8A show simulated iso-luminance diagrams for a prior art configuration of two crossed guest-host cells for f-stop numbers 1, 2, 3, 4, and 5, respectively. FIGS. 4B, 5B, 6B, 7B, and 8B show simulated iso-luminance diagrams for the first implementation for f-stop numbers 1, 2, 3, 4, and 5, respectively. FIGS. 4C, 5C, 6C, 7C, and 8C show simulated iso-luminance diagrams for the second implementation for f-stop numbers 1, 2, 3, 4, and 5, respectively.

The iso-luminance diagrams show the transmitted luminance as a function of polar and azimuthal angles, with the polar angles extending outward from the center to 60° and the full range of azimuthal viewing angles going counterclockwise around the diagram from 0° to 360°. The center of each iso-luminance diagram corresponds to the nominal f-stop luminance at normal incidence of 50%, for f/1; 25%, for f/2; 12.5%, for f/3; 6.25%, for f/4; and 3.125%, for f/5. The luminance values at f/1 divided by the luminance values at f/5 correspond to a contrast ratio of 16, which can be considered to be high for a guest-host system capable of achieving a f/1 transmissive state. The iso-luminance contour lines indicate luminance values that increase, decrease, or both, in increments of 20% from the normal incidence value. The iso-luminance diagrams of FIGS. 4A, 5A, 6A, 7A, 8A, 4B, 5B, 6B, 7B, 8B, 4C, 5C, 6C, 7C, and 8C are simulated in an environment with a refractive index of 1.5 in order to compare the effects of large polar angles inside the liquid crystal layers. In air, the polar angles would be smaller because of refraction effects determined by Snell's law. For example, a 10° incident angle in air would correspond to a 6.6° incident angle inside a surrounding medium with a refractive index of 1.5.

Figure 9A:
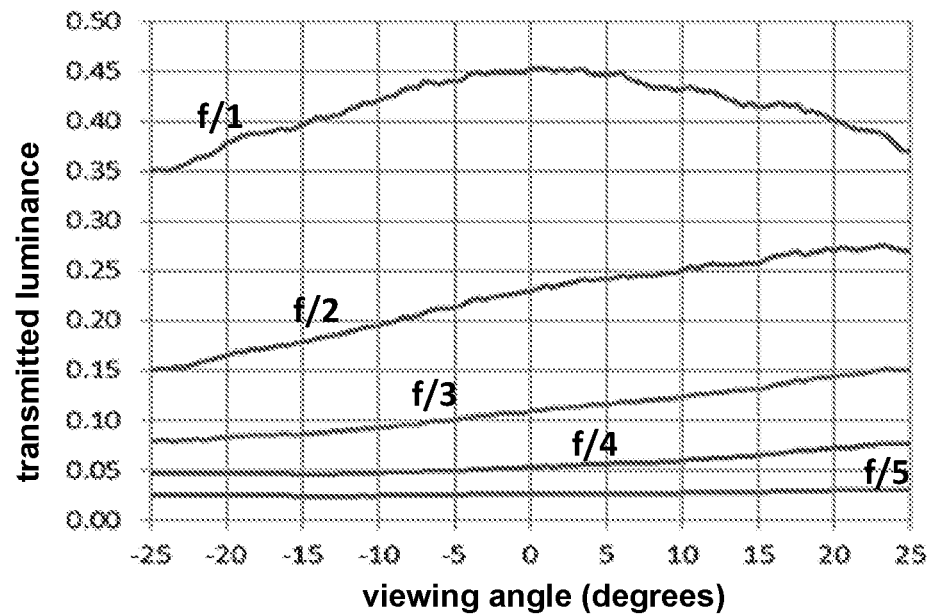
FIG. 9A shows the experimentally measured angular dependence in the 0°-180° azimuthal plane of a prior art variable transmission filter.
Figure 9B:
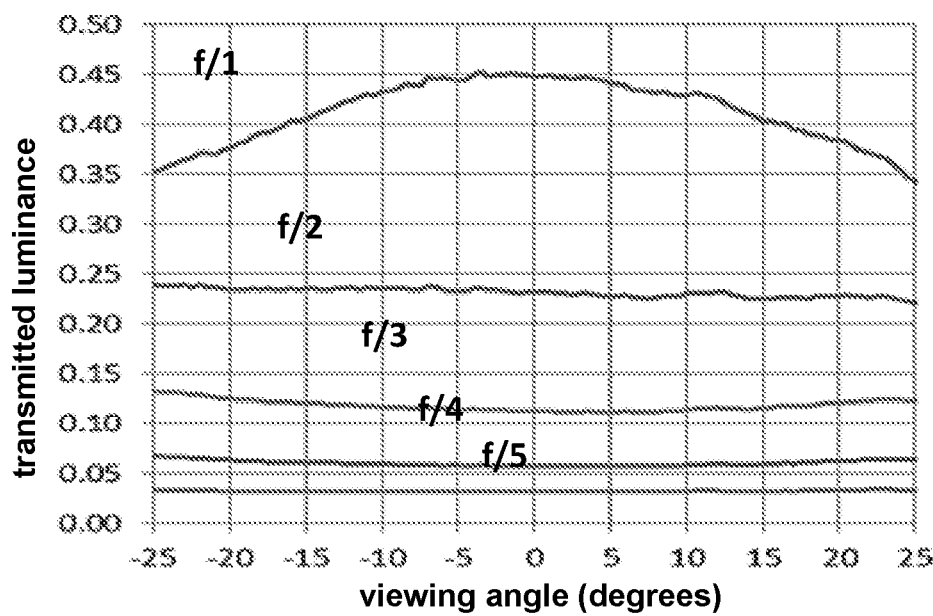
FIG. 9B shows the experimentally measured angular dependence in the 0°-180° azimuthal plane of a variable transmission filter implemented with a conventional half-wave optical retarder in the embodiment depicted in FIG. 1.
Figure 10A:
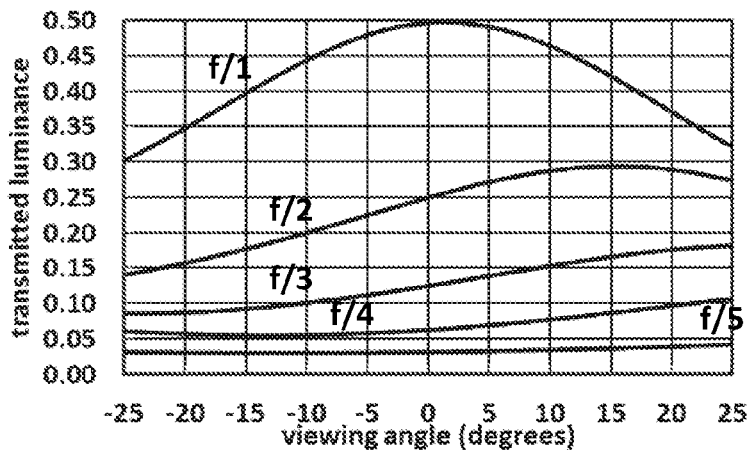
FIG. 10A shows the simulated angular dependence in the 0°-180° azimuthal plane of a prior art variable transmission filter.
Figure 10B:
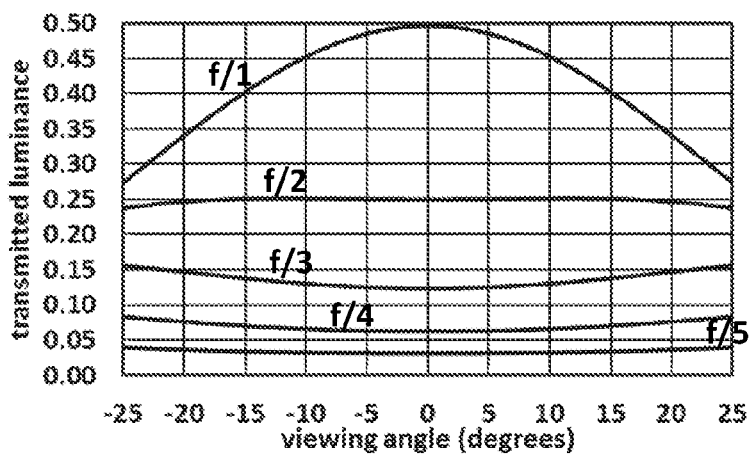
FIG. 10B shows the simulated angular dependence in the 0°-180° azimuthal plane of a variable transmission filter implemented with a conventional half-wave optical retarder in the embodiment depicted in FIG. 1.
Figure 10C:
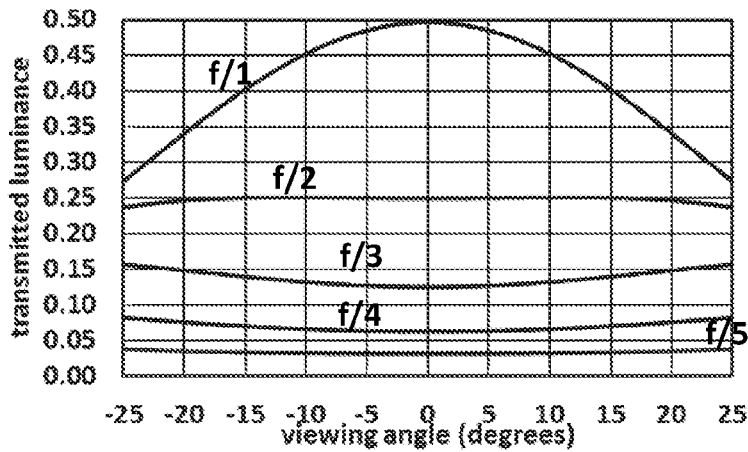
FIG. 10C shows the simulated angular dependence in the 0°-180° azimuthal plane of a variable transmission filter implemented with an achromatic 90°-polarization rotator in the embodiment depicted in FIG. 1.

FIG. 9A shows the experimentally measured viewing angle dependence of the transmitted luminance of the prior art dual guest-host transmission filter for f-stops of f/1, f/2, f/3, f/4, and f/5 measured in the 0°-180° azimuthal plane for polar angles ranging from −25° to +25°. FIG. 9B shows the experimentally measured viewing angle dependence of the transmitted luminance of the first implementation also measured in the 0°-180° azimuthal plane for polar angles ranging from −25° to +25°. Comparing FIG. 9A with FIG. 9B, the angular dependence and asymmetry of the transmitted luminance of the disclosed variable transmission filter is seen to be significantly less than that of the prior art configuration of two crossed guest-host devices. The experimental guest-host devices used in the above measurements comprise two VAN guest-host cells, each with a 9.0 μm cell gap and 87° pretilt angles α with the alignment surfaces. The liquid crystal guest-host mixture is a commercial black dye mixture TEC90700-100 diluted with the host mixture TEC92700-100 to achieve f/1 transmittance when no voltage is applied. These materials are available from HCCH, Jiangsu Hecheng Display Technology Co., LTD, Nanjing, China. FIG. 10A shows the simulated viewing angle dependence of the prior art transmission filter, FIG. 10B shows the simulated viewing angle dependence of first implementation of the disclosed variable transmission filter using the half-wave optical retarder as optical element 44 in FIG. 1, and FIG. 10C shows the simulated viewing angle dependence of the second implementation of the disclosed variable transmission filter using the achromatic 90°-polarization rotator as optical element 44 in FIG. 1. All of the simulations are made in the 0°-180° azimuthal plane for polar angles ranging from −25° to +25°, so the results can be directly compared to the experimental measurements of FIGS. 9A and 9B. The simulated results of FIG. 10A for the prior art transmission filter are in good agreement with the experimental results of FIG. 9A, as are the simulated results of FIG. 10B for the first implementation of the disclosed variable transmission filter with the experimental results of FIG. 9B. Experimental measurements are not presented for the angular dependence of the second implementation of the disclosed variable transmission filter, but since the simulated results shown in FIG. 10C for the angular dependence of the second implementation are nearly the same as those shown in FIG. 10B for the first implementation, it is expected that the experimental results for the angular dependence of the second implementation would also be similar.

Figure 11:
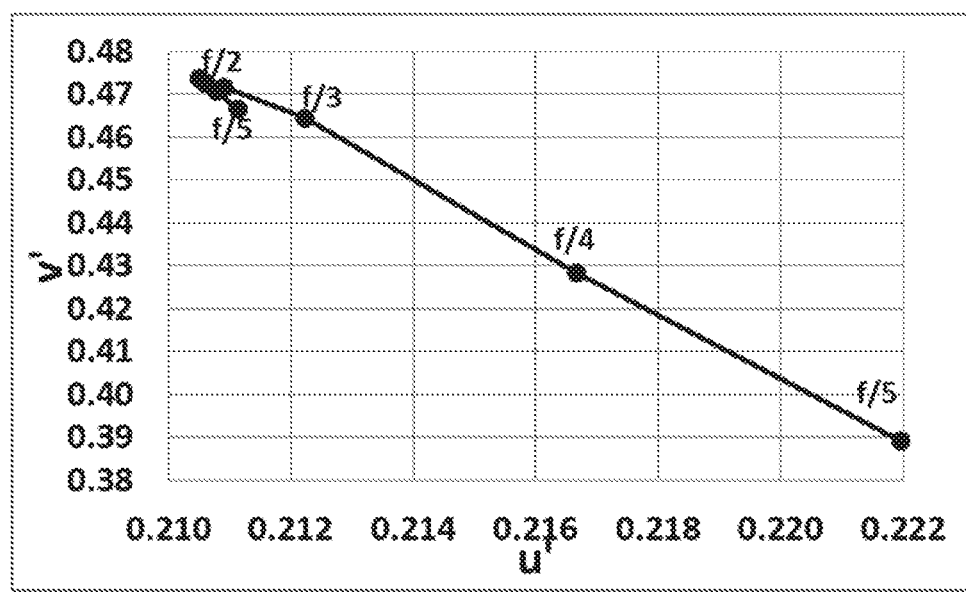
FIG. 11 shows the simulated f-stop dependence of the color of the transmitted light in terms of the u', v' chromaticity coordinates in the 1976 CIE uniform color space in accordance with the disclosure.

FIG. 11 shows the simulated f-stop dependence of the color of the transmitted light in terms of the u', v' chromaticity coordinates in the 1976 CIE uniform color space. The amount of color shift for f-stop values ranging from f/1 to f/5 is indicated by the length of the lines inscribed in the CIE color space, the shorter line being for the second implementation and the longer line for the first implementation of the disclosed variable transmission filter. The second implementation of the disclosed variable transmission filter therefore undergoes less color shift than that of the first implementation. For these simulations, the half-wave optical retarder is assumed to have a retardation of 275 nm for all wavelengths.

FIGS. 12A, 13A, 14A, 15A, and 16A show simulated iso-luminance diagrams for a prior art configuration of two crossed guest-host cells for f-stop numbers 1, 2, 3, 4, and 4.5, respectively. FIGS. 12B, 13B, 14B, and 15B show simulated iso-luminance diagrams for the first implementation using a polycarbonate half-wave optical retarder having a retardation of 275 nm at a wavelength of 550 nm for f-stop numbers 1, 2, 3, and 4, respectively. These simulations and the ones that follow include the wavelength dispersion of the polycarbonate retarder. Because of the large amount leakage at wavelengths other than 550 nm, it was not possible to achieve an f-stop number of 4.5 using this optical retarder (and hence there is no FIG. 16B in the set of simulated iso-luminance diagrams). FIGS. 12C, 13C, 14C, 15C, and 16C show simulated iso-luminance diagrams for the fourth implementation of a Teijin-type wide-band half-wave optical retarder for f-stop numbers 1, 2, 3, 4, and 4.5, respectively. These simulations are made in an air environment so that the polar angle of the iso-luminance diagrams would correspond to what would be measured in the laboratory. As before, the iso-luminance contour lines indicate luminance values that increase, decrease, or both, in increments of 20% from the normal incidence value.

Figure 12A:
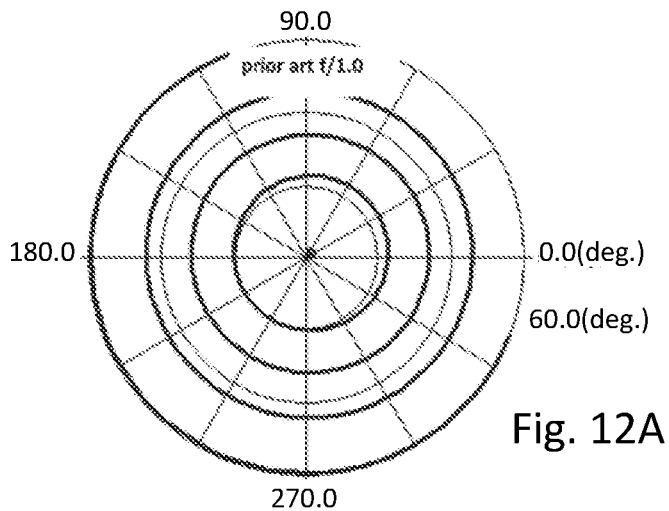
FIG. 12A shows a simulated iso-luminance diagram for a prior art transmissive filter, with drive voltages adjusted for f/1 transmittance for normally incident light.
Figure 12B:
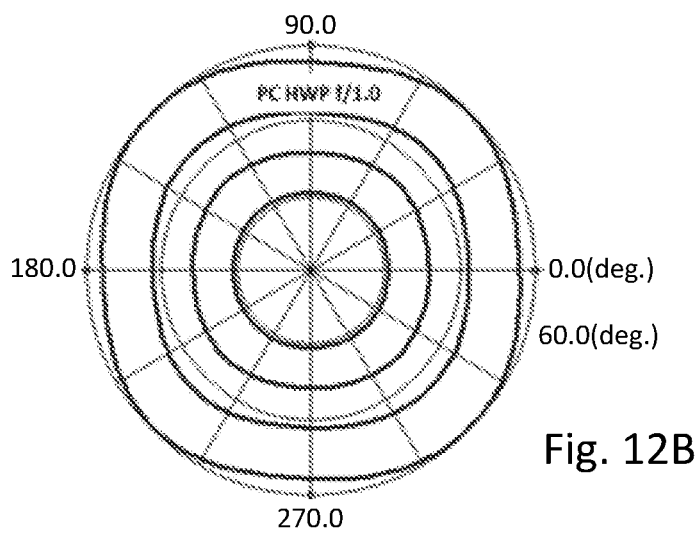
FIG. 12B shows a simulated iso-luminance diagram for a wide-angle transmissive filter including a polycarbonate half-wave optical retarder in accordance with the disclosure, with drive voltages adjusted for f/1 transmittance for normally incident light.
Figure 12C:
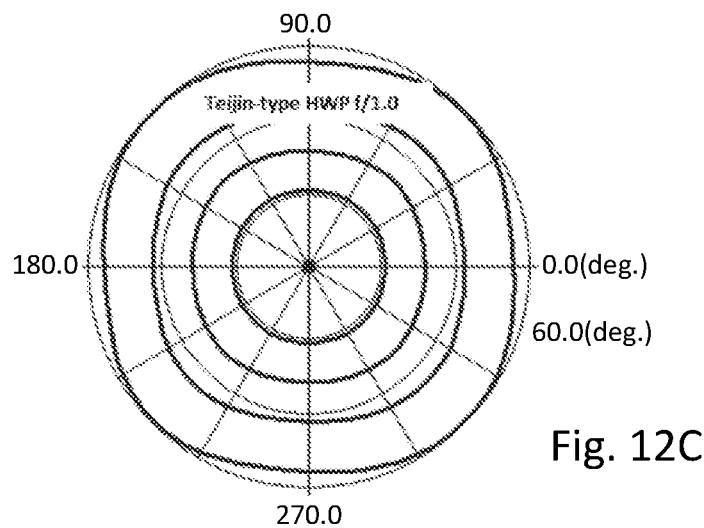
FIG. 12C shows a simulated iso-luminance diagram for a wide-angle transmissive filter including a Teijin-type half-wave optical retarder in accordance with the disclosure, with drive voltages adjusted for f/1 transmittance for normally incident light.
Figure 13A:
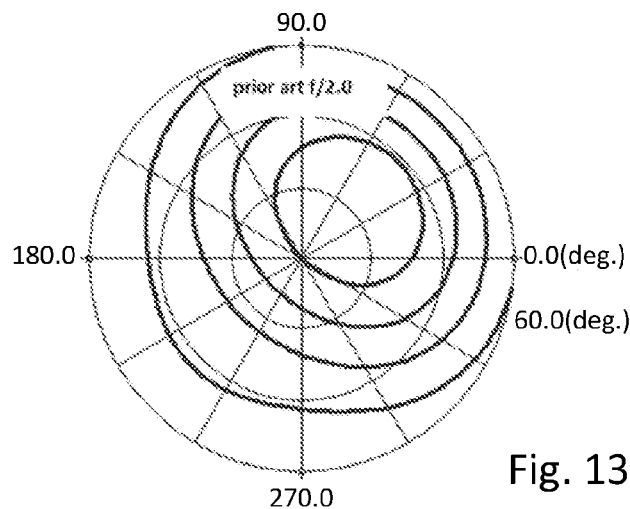
FIG. 13A shows a simulated iso-luminance diagram for a prior art transmissive filter, with drive voltages adjusted for f/2 transmittance for normally incident light.
Figure 13B:
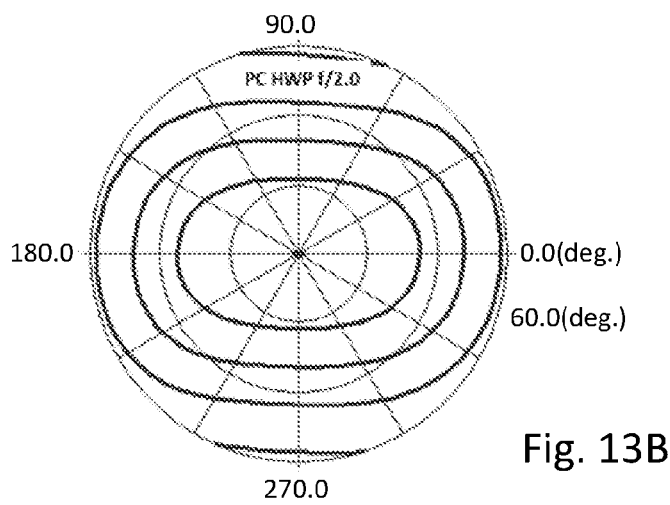
FIG. 13B shows a simulated iso-luminance diagram for a wide-angle transmissive filter including a polycarbonate half-wave optical retarder in accordance with the disclosure, with drive voltages adjusted for f/2 transmittance for normally incident light.
Figure 13C:
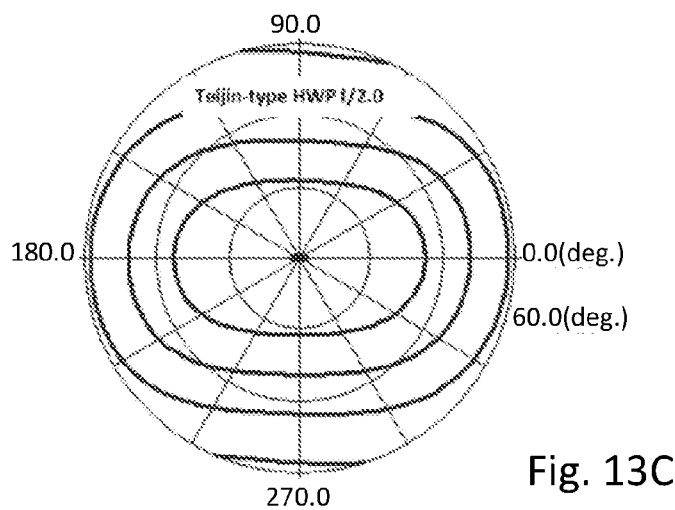
FIG. 13C shows a simulated iso-luminance diagram for a wide-angle transmissive filter including a Teijin-type half-wave optical retarder in accordance with the disclosure, with drive voltages adjusted for f/2 transmittance for normally incident light.
Figure 14A:
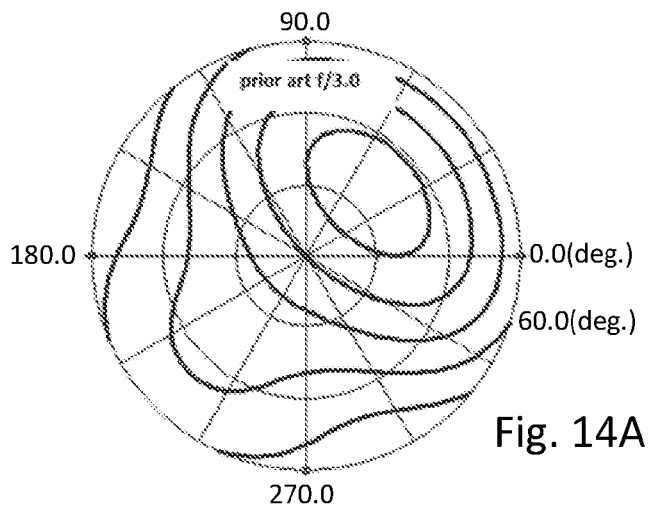
FIG. 14A shows a simulated iso-luminance diagram for a prior art transmissive filter, with drive voltages adjusted for f/3 transmittance for normally incident light.
Figure 14B:
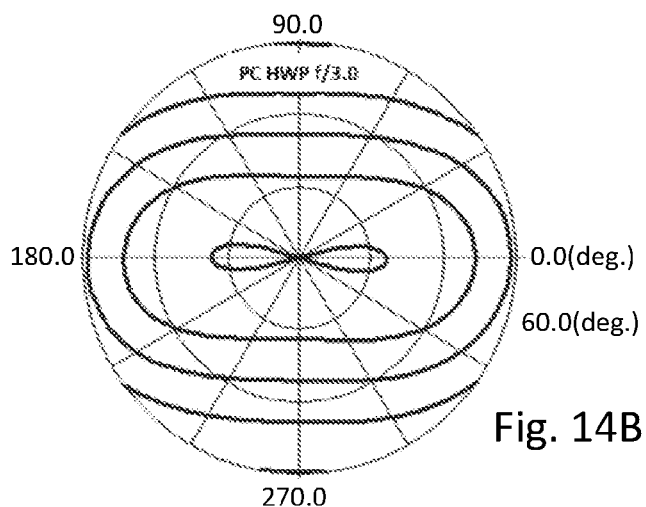
FIG. 14B shows a simulated iso-luminance diagram for a wide-angle transmissive filter including a polycarbonate half-wave optical retarder in accordance with the disclosure, with drive voltages adjusted for f/3 transmittance for normally incident light.
Figure 14C:
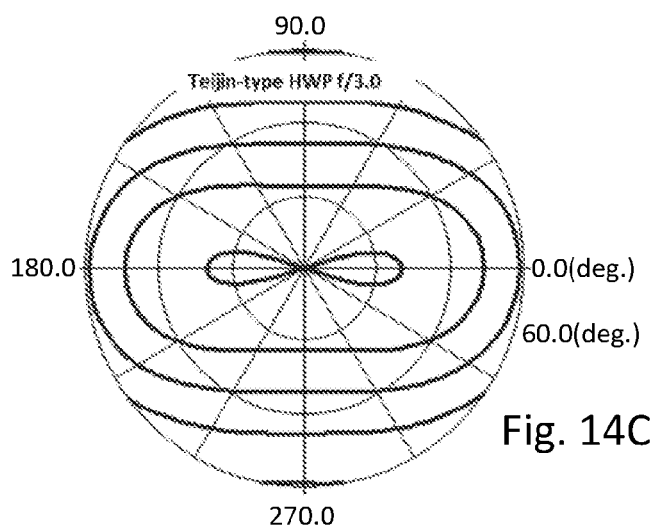
FIG. 14C shows a simulated iso-luminance diagram for a wide-angle transmissive filter including a Teijin-type half-wave optical retarder in accordance with the disclosure, with drive voltages adjusted for f/3 transmittance for normally incident light.
Figure 15A:
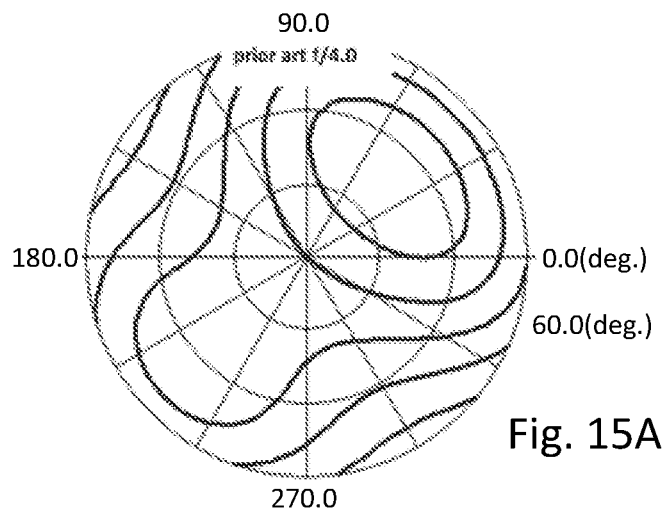
FIG. 15A shows a simulated iso-luminance diagram for a prior art transmissive filter, with drive voltages adjusted for f/4 transmittance for normally incident light.
Figure 15B:
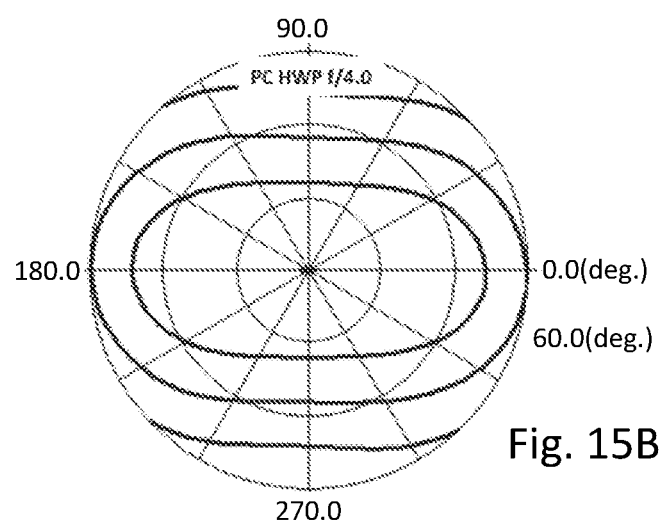
FIG. 15B shows a simulated iso-luminance diagram for a wide-angle transmissive filter including a polycarbonate half-wave optical retarder in accordance with the disclosure, with drive voltages adjusted for f/4 transmittance for normally incident light.
Figure 15C:
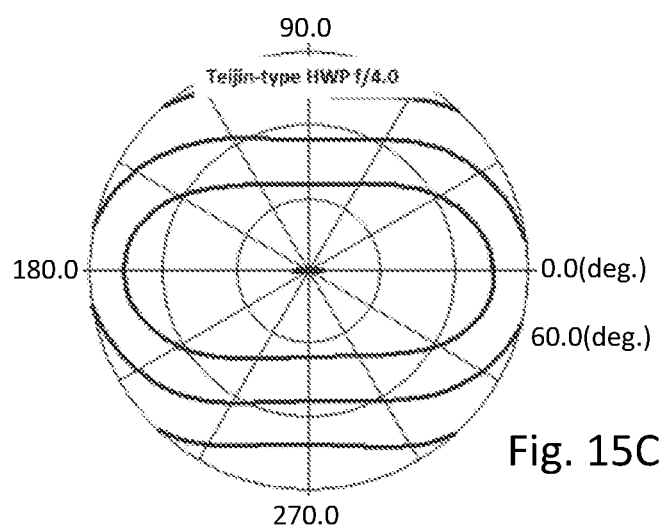
FIG. 15C shows a simulated iso-luminance diagram for a wide-angle transmissive filter including a Teijin-type half-wave optical retarder in accordance with the disclosure, with drive voltages adjusted for f/4 transmittance for normally incident light.
Figure 16A:
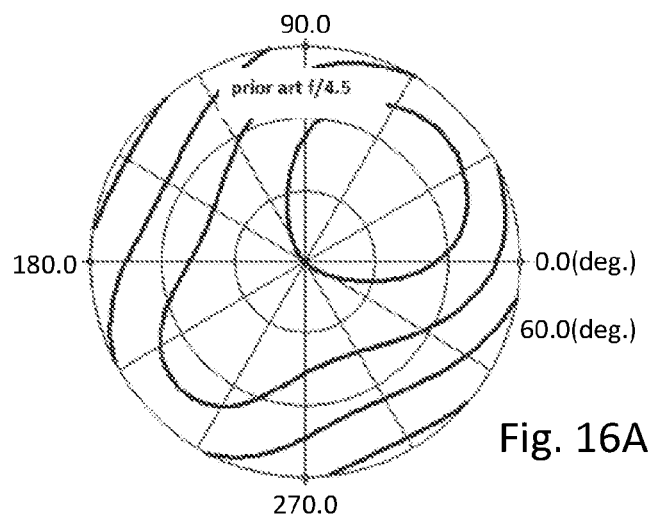
FIG. 16A shows a simulated iso-luminance diagram for a prior art transmissive filter, with drive voltages adjusted for f/4.5 transmittance for normally incident light.
Figure 16C:
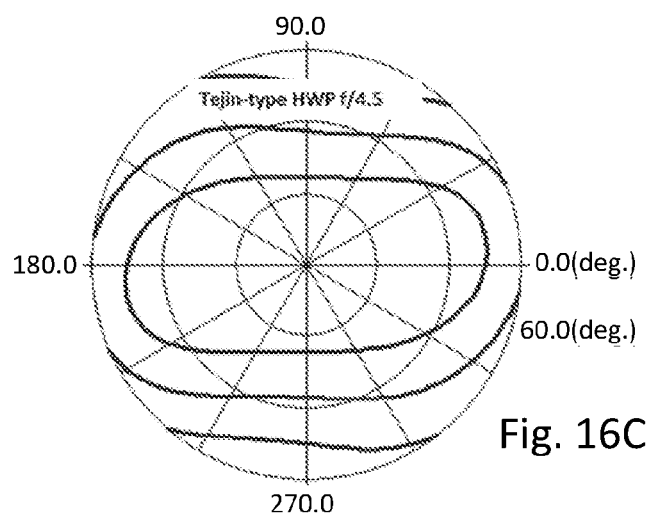
FIG. 16C shows a simulated iso-luminance diagram for a wide-angle transmissive filter including a Teijin-type half-wave optical retarder in accordance with the disclosure, with drive voltages adjusted for f/4.5 transmittance for normally incident light.
Figure 17A:
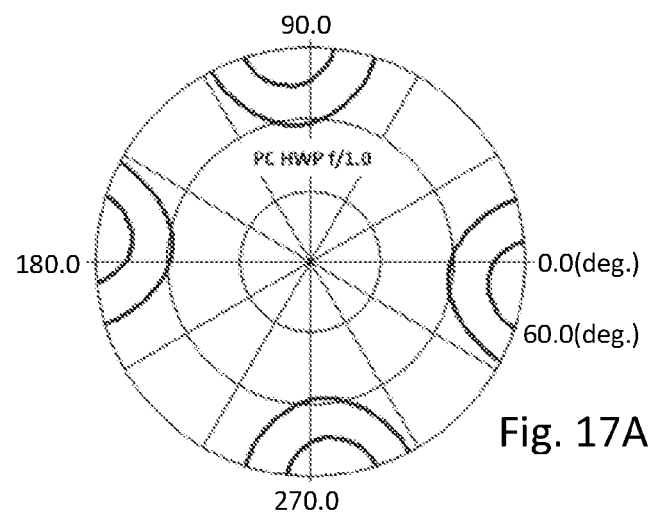
FIG. 17A shows a simulated iso-chromaticity difference diagram for a wide-angle transmissive filter including a polycarbonate half-wave optical retarder in accordance with the disclosure, with drive voltages adjusted for f/1 transmittance for normally incident light.
Figure 17B:
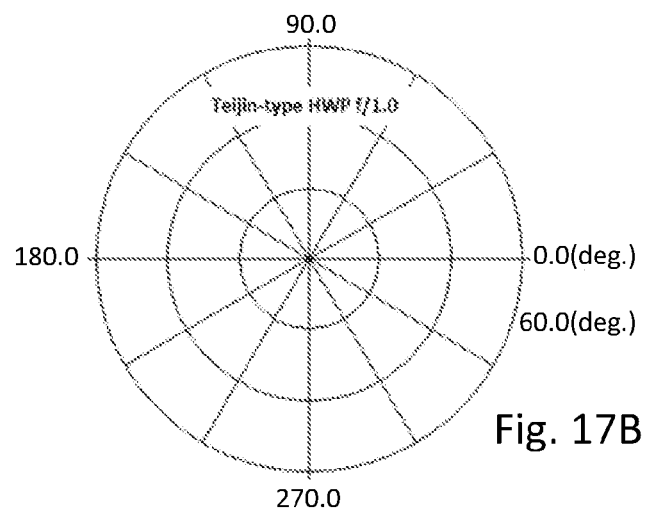
FIG. 17B shows a simulated iso-chromaticity difference diagram for a wide-angle transmissive filter including a Teijin-type half-wave optical retarder in accordance with the disclosure, with drive voltages adjusted for f/1 transmittance for normally incident light.
Figure 18A:
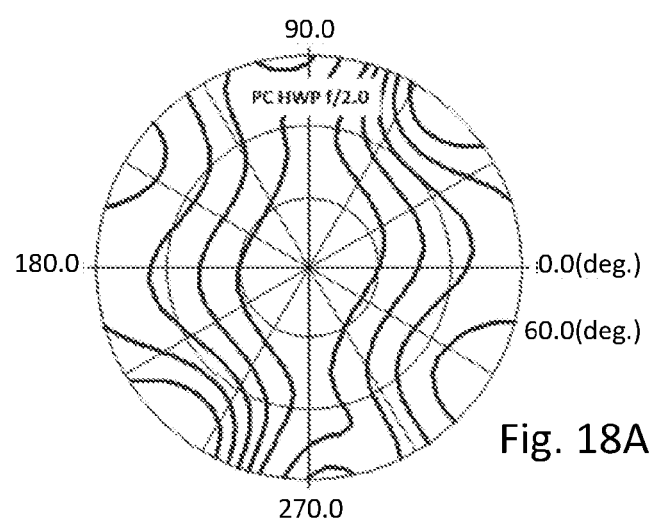
FIG. 18A shows a simulated iso-chromaticity difference diagram for a wide-angle transmissive filter including a polycarbonate half-wave optical retarder in accordance with the disclosure, with drive voltages adjusted for f/2 transmittance for normally incident light.
Figure 18B:
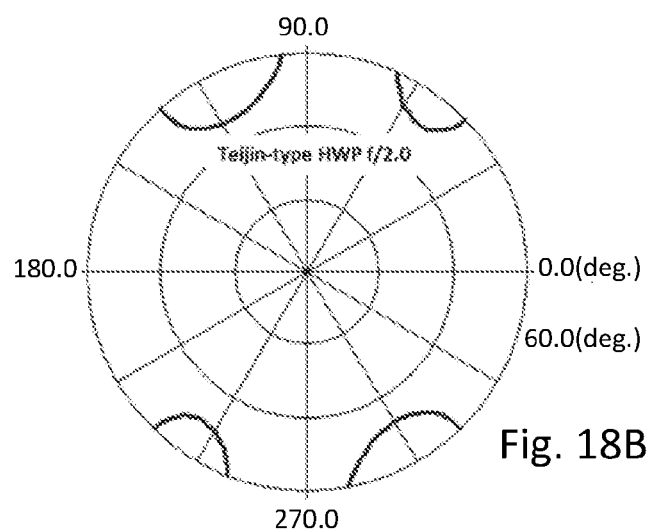
FIG. 18B shows a simulated iso-chromaticity difference diagram for a wide-angle transmissive filter including a Teijin-type half-wave optical retarder in accordance with the disclosure, with drive voltages adjusted for f/2 transmittance for normally incident light.
Figure 19A:
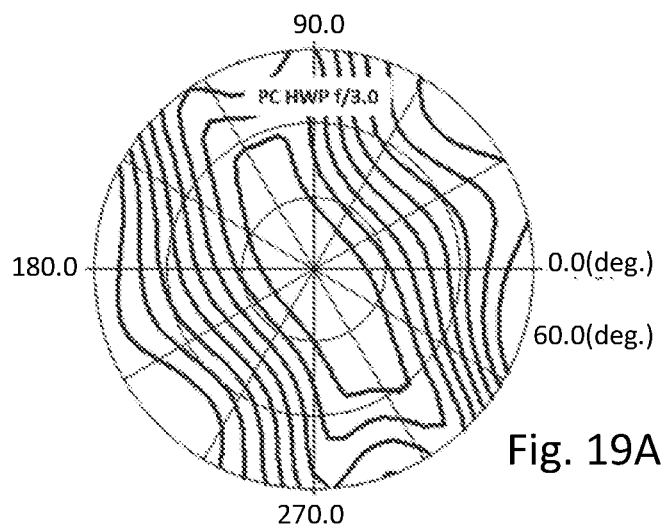
FIG. 19A shows a simulated iso-chromaticity difference diagram for a wide-angle transmissive filter including a polycarbonate half-wave optical retarder in accordance with the disclosure, with drive voltages adjusted for f/3 transmittance for normally incident light.
Figure 19B:
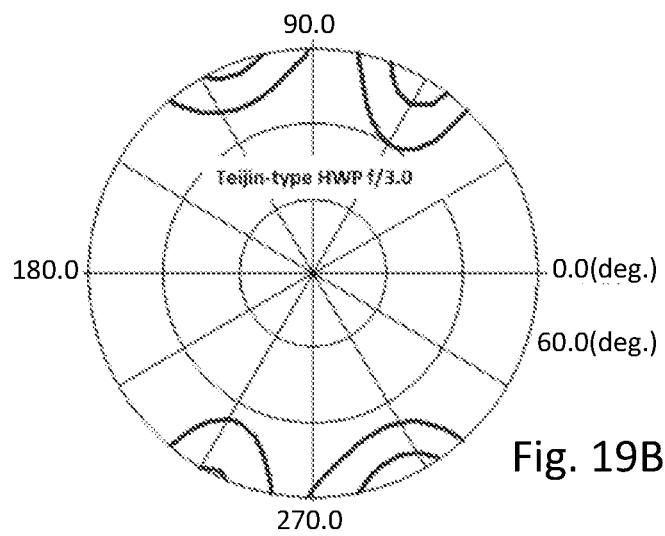
FIG. 19B shows a simulated iso-chromaticity difference diagram for a wide-angle transmissive filter including a Teijin-type half-wave optical retarder in accordance with the disclosure, with drive voltages adjusted for f/3 transmittance for normally incident light.
Figure 20A:
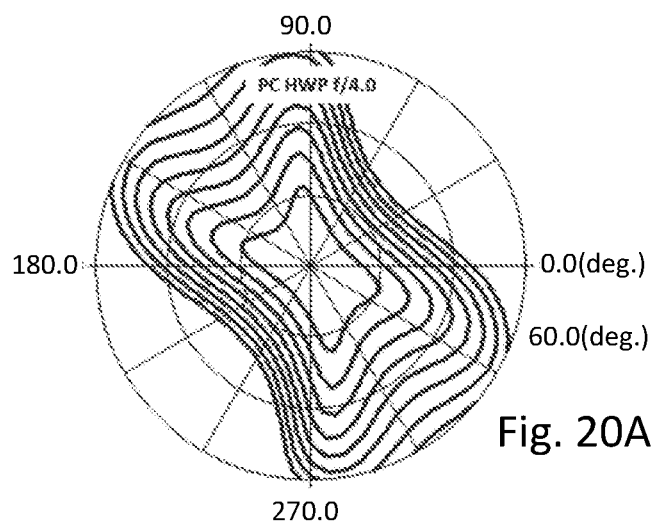
FIG. 20A shows a simulated iso-chromaticity difference diagram for a wide-angle transmissive filter including a polycarbonate half-wave optical retarder in accordance with the disclosure, with drive voltages adjusted for f/4 transmittance for normally incident light.
Figure 20B:
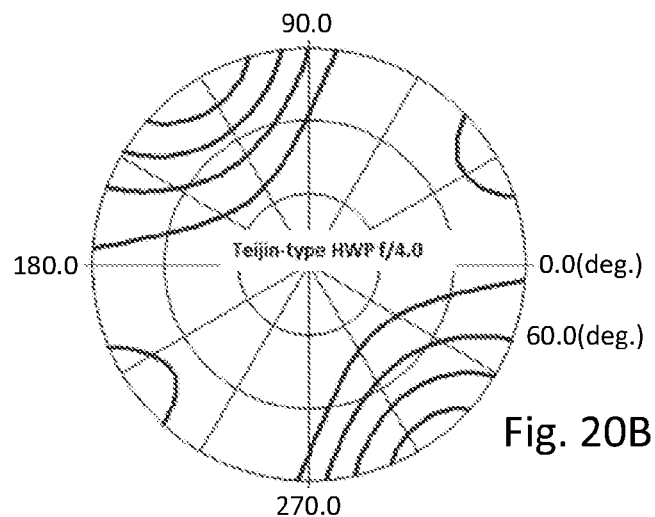
FIG. 20B shows a simulated iso-chromaticity difference diagram for a wide-angle transmissive filter including a Teijin-type half-wave optical retarder in accordance with the disclosure, with drive voltages adjusted for f/4 transmittance for normally incident light.
Figure 21B:
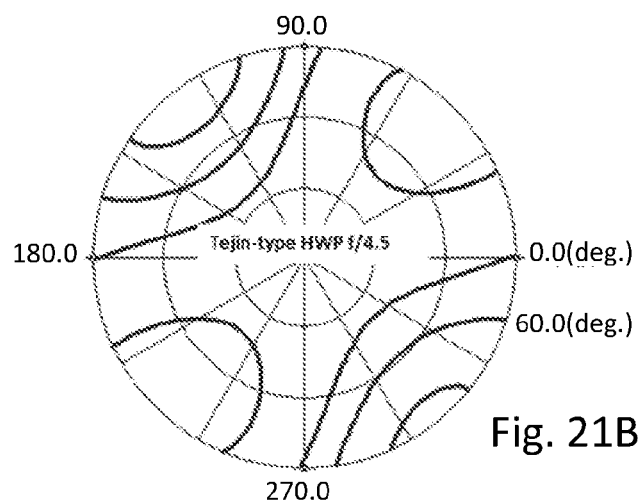
FIG. 21B shows a simulated iso-chromaticity difference diagram for a wide-angle transmissive filter including a Teijin-type half-wave optical retarder in accordance with the disclosure, with drive voltages adjusted for f/4.5 transmittance for normally incident light.

Except for the nearly circular contour lines for the f/1 case of the prior art configuration of two crossed guest-host cells shown in FIG. 12A, the f/2, f/3, f/4, and f/4.5, cases shown in FIGS. 13A, 14A, 15A, and 16A exhibit unsymmetrical, lopsided luminance contour lines. Such luminance contour lines make the prior art configuration unsuitable for use as a variable transmission filter with wide viewing angle. The polycarbonate and Teijin-type half-wave optical retarders, on the other hand, exhibit both horizontal and vertical symmetry with little variation in luminance for polar angles extending out to about 20°.

It is desirable for many applications of guest-host variable transmission filter 10 that it behave as a variable neutral density filter for all visible wavelengths. In this case, the liquid crystal material inside guest-host liquid crystal devices 12 and 14 includes a black guest-host dichroic dye mixture, and it is advantageous to minimize the color shift with viewing angle. This can be achieved in wide-angle variable transmission filter 10 of this disclosure. The amount of color shift introduced by the variable density filter of this disclosure from the color at normal incidence to the colors at other viewing angles under uniformly white illumination can be quantitatively described by ΔC* defined as follows:

$$L^* = 116\left[\frac{Y}{Y_n}\right]^{\frac{1}{3}} - 16$$

$$u^* = 13L^*(u' - u'_n)$$

$$v^* = 13L^*(v' - v'_n),$$

where Y is the luminance and the subscript n refers to the luminance and chromaticity coordinates (u', v') at the specified white point. The chromaticity difference ΔC* between the color coordinates $u_1^*$ and $v_1^*$ at normal incidence and the color coordinates $u_2^*$ and $v_2^*$ at other incident and azimuthal angles is given by:

$$\Delta C^* = \sqrt{(u_2^* - u_1^*)^2 + (v_2^* - v_1^*)^2}.$$

Roughly speaking, ΔC*≤1 is not perceptible by human eyes; 1<ΔC*≤2 would be perceptible through close observation, and 2<ΔC*≤10 would be perceptible at a glance.

FIGS. 17A, 18A, 19A, 20A, 17B, 18B, 19B, 20B, and 21B show simulated iso-chromaticity difference diagrams. The contour lines in these diagrams represent contours of equal chromaticity difference, with ΔC*=0 at the center of the diagram, followed by contour lines with by ΔC*=1 at larger polar angles, followed by ΔC*=2 at still larger polar angles, and so on, incrementing by 1 each time up to ΔC*=8. FIGS. 17A, 18A, 19A, and 20A show simulated iso-chromaticity difference diagrams for the first implementation using a polycarbonate half-wave optical retarder for f-stop numbers 1, 2, 3, and 4, respectively. (The inability to achieve an f-stop number of 4.5 is the reason why there is no FIG. 21A in the set of simulated iso-chromaticity difference diagrams.) FIGS. 17B, 18B, 19B, 20B, and 21B show simulated iso-chromaticity difference diagrams for the fourth implementation of a Teijin-type achromatic half-wave optical retarder for f-stop numbers 1, 2, 3, 4, and 4.5, respectively. Comparing these iso-chromaticity diagrams, implementation 4 using the Teijin-type half-wave optical retarder exhibits far less color shift with viewing angle compared to that exhibited by implementation 1 using the polycarbonate half-wave optical retarder.

Figure 22:
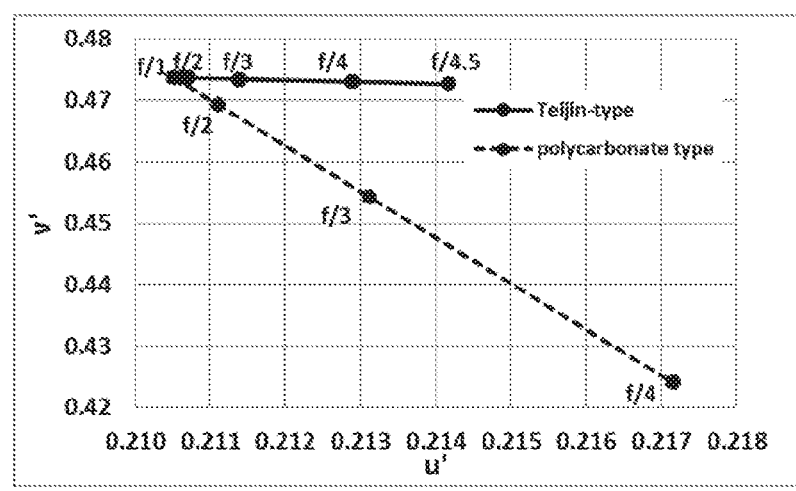
FIG. 22 shows the simulated f-stop dependence of the color of the light transmitted at normal incidence in terms of the u', v' chromaticity coordinates in the 1976 CIE uniform color space in accordance with the disclosure.

At normal incidence, there is also a color shift as the f-stop number is changed by changing the drive voltage. FIG. 22 shows quantitatively on the 1976 CIE (u', v') uniform color space the results of a simulation of this color shift for the first implementation of the disclosure that uses the polycarbonate half-wave optical retarder compared with the fourth implementation of the disclosure that uses the Teijin-type wide-band half-wave optical retarder. For the same f-stop number, the Teijin-type wide-band half-wave optical retarder exhibits considerably less color shift than that exhibited by the polycarbonate half-wave optical retarder.

The amount of this kind of color shift can be reduced by adding an additional dichroic dye or dye mixture of the appropriate color to the black guest-host liquid crystal mixture. For example, with respect to the fourth implementation configured with the Teijin-type wide-band half-wave optical retarder, FIG. 22 shows that, as the f-stop number increases, the color is shifted towards the red. Adding a complementary, cyan-colored dichroic dye or dye mixture can counteract this red shift because the complementary dye or dye mixture will absorb increasingly more red light as the drive voltage and f-stop number increase, thereby compressing the color gamut to a smaller space.

Figure 23:
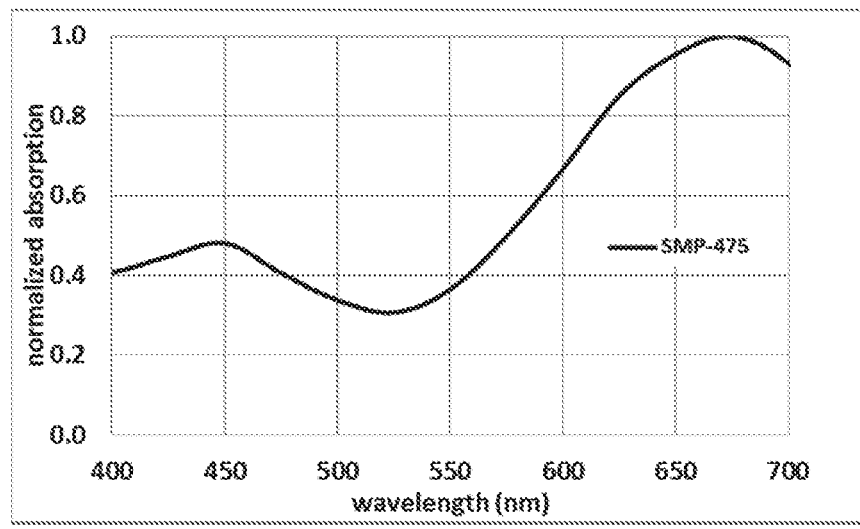
FIG. 23 shows the normalized absorption spectrum of the cyan colored dichroic dye used to reduce the f-stop dependence of the color of the light transmitted at normal incidence of the wide-angle variable transmission filter in accordance with the disclosure.
Figure 24:
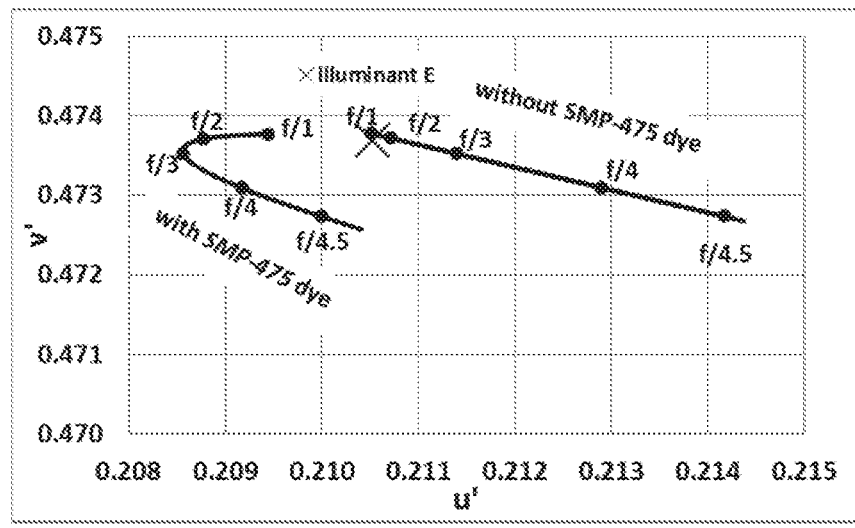
FIG. 24 shows the simulated f-stop dependence of the color of the light transmitted at normal incidence in terms of the u', v' chromaticity coordinates in the 1976 CIE uniform color space with and without the addition of the cyan colored dichroic dye in accordance with the disclosure.

In the following simulation, SMP-475 cyan dye, available from the Colors & Advanced Processing Dept. of NAGASE, Tokyo, Japan, is added to the black guest-host liquid crystal mixture. FIG. 23 shows the normalized absorption spectrum of SMP-475 cyan dye, which has a dichroic ratio of 7.8. FIG. 24 with an expanded vertical scale shows the compression effect of adding SMP-475 cyan dye to the black dye mixture in the fourth embodiment. The SMP-475 cyan dye is added in a concentration that brings the peak absorption of the resulting mixture to 5% of that of the black dye mixture. The addition of SMP-475 cyan dye causes the color coordinates for all f-stop numbers to shift in the direction of the complementary cyan color, but now the color coordinates are clustered closer together and occupy a much smaller space. If necessary, a small amount of an isotropic red dye could be added to the guest-host dye mixture to shift the entire cluster back towards the red to center the entire cluster onto the white point. This could also be accomplished with a weak red filter applied externally to guest-host liquid crystal variable transmission filter 10.

Figure 25:
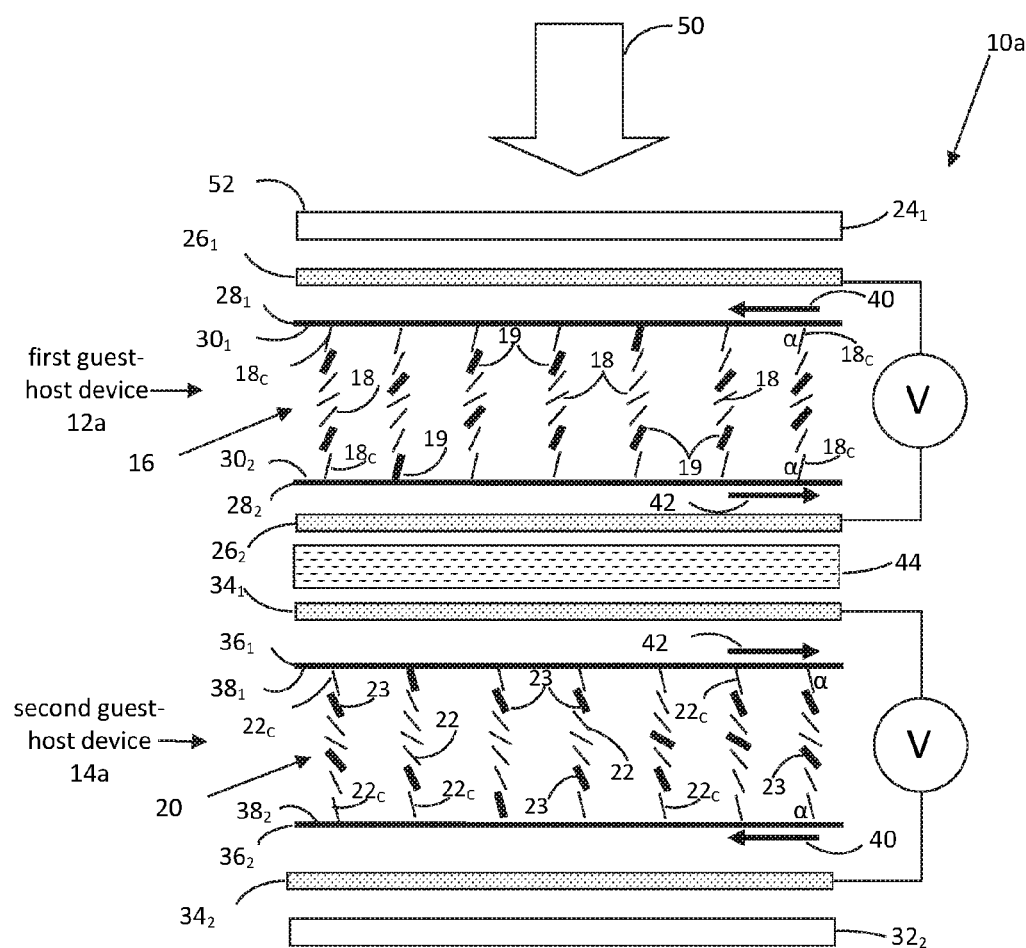
FIG. 25 is a diagrammatic exploded view of an alternative embodiment of the disclosed variable transmission filter, which includes a half-wave optical retarder also serving a common substrate for the two vertically aligned guest-host liquid crystal devices, one rotated 180° about its normal axis with respect to the other in a reverse arrangement.

FIG. 25 is a simplified diagram of an alternative preferred embodiment of the disclosed guest-host liquid crystal variable transmission filter 10. In this alternative embodiment, the two inner substrates $24_2$ and $32_1$ of the embodiment shown in FIG. 1 are removed from first guest-host device 12 and second guest-host device 14 and are replaced by single optical element 44, which now acts as a half-wave optical retarder as well as an inner substrate for a first guest-host device 12a and a second guest-host device 14a. This alternative embodiment results in a thinner, lighter guest-host liquid crystal variable transmission filter 10a, which includes first guest-host device 12a and second guest-host device 14a and is particularly suitable for eyewear, especially if outer substrates $24_1$ and $32_2$ are made from flexible, plastic materials that can be formed into curved shapes. The other numbered elements in FIG. 25 are the same as those already described with reference to FIG. 1.

Figure 26:
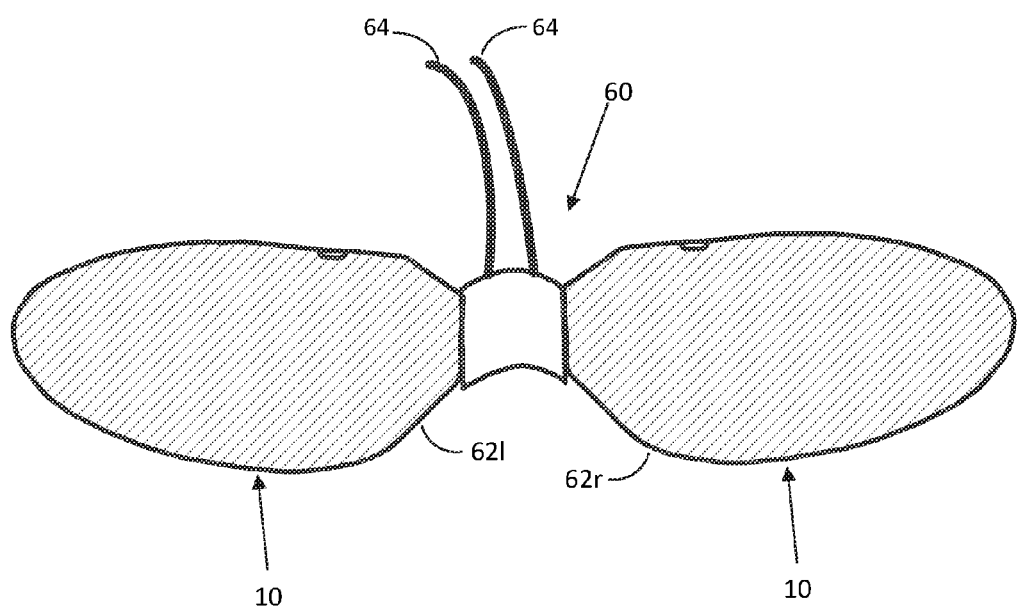
FIG. 26 is a pictorial view of smart eyewear that incorporates in each eyepiece the variable transmission filter of FIG. 1 or FIG. 25.

FIG. 26 is a pictorial view of smart eyewear 60 that incorporates in each eyepiece 62l, 62r one variable transmission filter 10 functioning as an electronic dimming filter, with a continuously variable level of dimming adjusted by the drive voltages applied to sets of wires 64. Augmented reality glasses and sunglasses are two examples of suitable applications of variable transmission filter 10 for smart eyewear benefiting from electronic dimming control.

In the case of augmented reality glasses, which add virtual information to a real world scene, the brightness of the near-eye display system is one factor that determines how distinct the augmented world is visually perceived by the eyeglasses wearer. As lighting conditions change, for example when the eyeglasses wearer goes from indoors to outdoors, the brightness ratio of the two worlds also changes, something that can result in significantly reduced legibility. A solution for overcoming this change in brightness ratio is to incorporate a dimming filter that controls the amount of ambient light reaching the eyeglasses wearer's eye and matches the ambient light to the display system brightness. Variable transmission filter 10 provides such analog dimming control.

It will be obvious to those having skill in the art that many changes may be made to the details of the above-described embodiment without departing from the underlying principles of the invention. The scope of the present invention should, therefore, be determined only by the following claims.

The invention claimed is:

1. An electro-optic guest-host liquid crystal variable transmission filter with wide viewing angle, comprising:
a first guest-host liquid crystal device including a spaced-apart pair of first electrode structures having interior surfaces and a second guest-host liquid crystal device including a spaced-apart pair of second electrode structures having interior surfaces, the first and second guest-host liquid crystal devices arranged in optical series and being quasi-homeotropically oriented electrically controlled birefringence (ECB) devices containing liquid crystal material with negative dielectric anisotropy;
spaced-apart first alignment surfaces formed on the interior surfaces of the pair of first electrode structures of the first guest-host liquid crystal device;
first liquid crystal directors confined between the first electrode structures, the first liquid crystal directors forming a first director field and including first surface-contacting directors that contact each of the first alignment surfaces;
spaced-apart second alignment surfaces formed on the interior surfaces of the pair of second electrode structures of the second guest-host liquid crystal device;
second liquid crystal directors confined between the second electrode structures, the second liquid crystal directors forming a second director field and including second surface-contacting directors that contact each of the second alignment surfaces;
corresponding ones of the first and second liquid crystal directors in the respective first and second director fields being in reverse arrangement; and
a polarization state-changing device positioned between the first and second guest-host liquid crystal devices.

2. The liquid crystal variable transmission filter of claim 1, in which the polarization state-changing device is a half-wave optical retarder.

3. The liquid crystal variable transmission filter of claim 2, in which the half-wave optical retarder is a wide-band half-wave optical retarder that includes a blend polymer or a copolymer of optically positive and negative monomer units.

4. The liquid crystal variable transmission filter of claim 1, in which the polarization state-changing device is an achromatic 90°-polarization rotator that includes multiple half-wave optical retarders.

5. The liquid crystal variable transmission filter of claim 1, in which the polarization state-changing device is a 90°-twisted nematic layer.

6. The liquid crystal variable transmission filter of claim 5, in which the 90°-twisted nematic layer is a twisted nematic liquid crystal cell.

7. The liquid crystal variable transmission filter of claim 5, in which the 90°-twisted nematic layer is a liquid crystal polymer layer.

8. The liquid crystal variable transmission filter of claim 1, in which the polarization state-changing device is a single wide-band polarization state-changing film that imparts half-wave optical retardation to each of two different wavelengths.

9. The liquid crystal variable transmission filter of claim 8, in which the single wide-band polarization state-changing film includes a blend polymer or a copolymer of optically positive and negative monomer units.

10. The liquid crystal variable transmission filter of claim 1, in which the liquid crystal material in the first and second guest-host liquid crystal devices includes liquid crystal mixed with a black dichroic dye or a dye mixture that includes multiple dichroic dye components of selected amounts that compensate for color shifts that result from changes in f-stop number settings of the variable transmission filter.

11. The liquid crystal variable transmission filter of claim 1, in which the liquid crystal material in the first and second guest-host liquid crystal devices includes: a liquid crystal mixed with a black dichroic dye or a dye mixture; multiple dichroic dye components in dye component concentrations that introduce a color shift in a direction toward a color component of a reference color space; and a compensating dichroic dye in a concentration that counteracts the color shift in a direction away from the color component of the reference color space.

12. The liquid crystal variable transmission filter of claim 1, in which the polarization state-changing device is included in an eyepiece of eyewear, and in which the polarization state-changing device contributes to electrically driven dimming control of light propagating through the eyepiece and reaching an eye of a wearer of the eyewear.

13. The liquid crystal variable transmission filter of claim 12, in which the polarization state-changing device is a single wide-band polarization state-changing film that imparts half-wave optical retardation to each of two different wavelengths.

14. The liquid crystal variable transmission filter of claim 12, in which the first and second pairs of electrode structures and the polarization state-changing device are made of flexible materials.

15. The liquid crystal variable transmission filter of claim 1, in which the polarization state-changing device has first and second major surfaces and is positioned between the first and second guest-host liquid crystal devices to form a common substrate of the first and second pairs of electrode structures, the first major surface of the polarization state-changing device included as part of the first electrode structure and the second major surface of the polarization state-changing device included as part of the second electrode structure.

16. The liquid crystal variable transmission filter of claim 15, in which the first and second pairs of electrode structures and the polarization state-changing device are made of flexible materials.

17. A method of overcoming angular dependence of light transmission in the operation of a guest-host liquid crystal variable transmission filter exhibiting high contrast ratio, the variable transmission filter receiving unpolarized incident light having first and second orthogonally related polarization states, comprising:
positioning in optical series a first guest-host liquid crystal device including a spaced-apart pair of first electrode structures having interior surfaces and a second guest-host liquid crystal device including a spaced-apart pair of second electrode structures having interior surfaces, the first and second guest-host liquid crystal devices being quasi-homeotropically oriented electrically controlled birefringence (ECB) devices containing liquid crystal material with negative dielectric anisotropy, the first guest-host liquid crystal device having spaced-apart first alignment structures that are formed on the interior surfaces of the pair of first electrode structures and include first liquid crystal directors confined between and having projections lying on the interior surfaces of the first electrodes, and the second guest-host liquid crystal device having spaced-apart second alignment structures that are formed on the interior surfaces of the pair of second electrode structures and include second liquid crystal directors confined between the second electrode structures, the first polarization state and the second polarization state being, respectively, parallel to and perpendicular to the projections of the first liquid crystal directors;

orienting the first and second guest-host liquid crystal devices to improve the viewing angle performance of the variable transmission filter by setting in reverse arrangement corresponding ones of the first and second liquid crystal directors, the reverse arrangement of the first and second director fields, in the absence of compensation, resulting in a diminution of contrast ratio caused by no appreciable change in transmittance of light of the second polarization state propagating through the variable transmission filter in response to electric fields applied to the first and second guest-host liquid crystal devices; and compensating for the reverse arrangement of the first and second director fields by positioning a polarization state-changing device between the first and second guest-host liquid crystal devices to counteract the diminution of contrast ratio, the polarization state-changing device introducing changes in polarization states of light exiting the first guest-host liquid crystal device such that transmittance of light in the first polarization state and in the second polarization state incident on the first guest-host liquid crystal device responds to, respectively, an electric field applied to the first guest-host liquid crystal device and an electric field applied to the second guest-host liquid crystal device to thereby provide a variable transmission filter exhibiting high contrast ratio and wide viewing angle performance.

18. The method of claim 17, in which the polarization state-changing device is a half-wave optical retarder.

19. The method of claim 17, in which the polarization state-changing device is a single wide-band polarization state-changing film that imparts half-wave optical retardation to each of two different wavelengths.

20. The method of claim 17, in which the polarization state-changing device is included in an eyepiece of eyewear, and in which the polarization state-changing device contributes to electrically driven dimming control of light propagating through the eyepiece and reaching an eye of a wearer of the eyewear.

* * * * *

UNITED STATES PATENT AND TRADEMARK OFFICE
CERTIFICATE OF CORRECTION

PATENT NO. : 9,933,631 B2
APPLICATION NO. : 15/450989
DATED : April 3, 2018
INVENTOR(S) : Osterman et al.

Page 1 of 1

It is certified that error appears in the above-identified patent and that said Letters Patent is hereby corrected as shown below:

In the Claims

Column 15, Line 22, change "director fields" to --liquid crystal directors--.

Column 16, Line 2, change "director fields" to --liquid crystal directors--.

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*